US012659907B2

(12) United States Patent
Si et al.

(10) Patent No.: US 12,659,907 B2
(45) Date of Patent: Jun. 16, 2026

(54) POSITIONING METHOD AND APPARATUS, AND RELATED DEVICE

(71) Applicant: VIVO MOBILE COMMUNICATION CO., LTD., Dongguan (CN)

(72) Inventors: Ye Si, Dongguan (CN); Huaming Wu, Dongguan (CN); Yuanyuan Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 534 days.

(21) Appl. No.: 18/155,993

(22) Filed: Jan. 18, 2023

(65) Prior Publication Data

US 2023/0164735 A1     May 25, 2023

Related U.S. Application Data

(63) Continuation of application No. PCT/CN2021/110514, filed on Aug. 4, 2021.

(30) Foreign Application Priority Data

Aug. 5, 2020     (CN) .......................... 202010780064.3

(51) Int. Cl.
        *H04W 64/00*          (2009.01)
        *H04W 76/28*          (2018.01)
(52) U.S. Cl.
        CPC ........... *H04W 64/00* (2013.01); *H04W 76/28* (2018.02)

(58) Field of Classification Search
        CPC . H04W 64/00; H04W 76/28; H04W 52/0216; H04W 68/025; H04L 5/005; H04L 5/0053; H04L 5/0091; Y02D 30/70
        See application file for complete search history.

(56) References Cited

U.S. PATENT DOCUMENTS

| | | | |
|---|---|---|---|
| 9,432,809 B2 | 8/2016 | Fischer | |
| 12,127,155 B2 * | 10/2024 | Goyal | H04W 64/00 |
| 12,418,789 B2 * | 9/2025 | Li | H04W 64/00 |

(Continued)

FOREIGN PATENT DOCUMENTS

| | | |
|---|---|---|
| CN | 102880045 A | 1/2013 |
| CN | 104521273 A | 4/2015 |

(Continued)

OTHER PUBLICATIONS

Extended European Search Report regarding European Patent Application No. 21852148.2, dated Oct. 25, 2023.

(Continued)

*Primary Examiner* — Kabir A Timory
(74) *Attorney, Agent, or Firm* — Harness, Dickey & Pierce, P.L.C.

(57)                   ABSTRACT
A positioning method, includes: receiving DRX configuration information; obtaining positioning configuration information, where the positioning configuration information includes at least one of PRS configuration information or positioning state information PSI configuration information; and performing a corresponding positioning behavior according to the DRX configuration information and the positioning configuration information, where the positioning behavior includes at least one of a positioning measurement behavior or a positioning reporting behavior.

17 Claims, 4 Drawing Sheets

12

Network side device 11                    11

Terminal

Terminal

(56) References Cited

U.S. PATENT DOCUMENTS

| | | | |
|---|---|---|---|
| 2015/0230112 A1 | 8/2015 | Siomina et al. | |
| 2019/0327673 A1 | 10/2019 | Bitra et al. | |
| 2022/0015185 A1 | 1/2022 | Jiang | |
| 2024/0040536 A1* | 2/2024 | Bao ........................... G01S 5/01 | |

FOREIGN PATENT DOCUMENTS

| | | |
|---|---|---|
| CN | 105393612 A | 3/2016 |
| CN | 106899941 A | 6/2017 |
| CN | 109565695 A | 4/2019 |
| CN | 109756995 A | 5/2019 |
| WO | WO-2018028925 A1 | 2/2018 |

OTHER PUBLICATIONS

International Search Report and Written Opinion of the International Searching Authority regarding International Patent Application No. PCT/CN2021/110514, dated Oct. 28, 2021. Translation provided by Bohui Intellectual Property.

"Discussion on PRS-RSRP measurement," Huawei, HiSilicon, 3GPP TSG-RAN WG4 Meeting #94-e, R4-2001638, dated Mar. 6, 2020.

First Office Action regarding Chinese Patent Application No. 202010780064.3, dated Jul. 19, 2022. Translation provided by Bohui Intellectual Property.

"LS on positioning SRS during DRX inactive time," Huawei, 3GPP TSG-RAN WG2 Meeting #109bis-e, R2-2003877, dated Apr. 30, 2020.

"Discussion on SRS for positioning during the DRX inactive period," vivo, 3GPP TSG-RAN WG2 Meeting #110-e, R2-2004461, dated Jun. 12, 2020.

"The submission of embedded *RRCReconfigurationComplete*," vivo, 3GPP TSG-RAN WG2 Meeting #110 electronic, R2-2004492, dated Jun. 12, 2020.

"Discussion on the impact of DRX on SRS for NR positioning," vivo 3GPP TSG-RAN WG2 Meeting #109bis-e, R2-2002618, dated Apr. 30, 2020.

"Remaining details on Phy-layer procedures for NR Positioning," Qualcomm Incorporated, 3GPP TSG RAN WG1 #98, R1-1912976, dated Oct. 18, 2019.

* cited by examiner

Network side device 11          11

Terminal

Terminal

S21

Receive discontinuous reception DRX configuration information

S22

Obtain positioning configuration information

S23

Perform a corresponding positioning behavior according to the DRX configuration information and the positioning configuration information

400

401 — Radio frequency unit

402 — Network module

410

Memory

409 — Application

Operating system

Processor

403 — Audio output unit

404

Input unit

Graphics processing unit — 4041

Microphone — 4042

408 — Interface unit

407

User input unit

4071 — Touch panel

4072 — Another input device

406

Display unit — 4061

Display panel

Sensor — 405

S51

Send indication signaling to a location server or a neighboring cell base station

600

POSITIONING METHOD AND APPARATUS, AND RELATED DEVICE

CROSS-REFERENCE TO RELATED APPLICATIONS

This application is a Bypass Continuation Application of PCT/CN2021/110514 filed on Aug. 4, 2021, which claims priority to Chinese Patent Application No. 202010780064.3 filed on Aug. 5, 2020, which are incorporated herein by reference in their entirety.

TECHNICAL FIELD

This disclosure relates to the field of communications technologies, and in particular relates to a positioning method and apparatus, and a related device.

BACKGROUND

In a communications system, a terminal may measure positioning reference signals (PRS) of a plurality of transmission receiving points (TRP) according to positioning assistance information sent by a location server, where the plurality of TRPs may be from a plurality of cells. To save power consumption of the terminal, a discontinuous reception (DRX) mechanism is further introduced in the communications system. Power saving of the terminal is achieved by configuring a DRX on and off time. Illustratively, on duration of a DRX cycle is a DRX on range, and an opportunity for DRX is a DRX off range. After the DRX is configured, if no scheduling is performed in a range of the on duration, after the on duration, the terminal enters the DRX off range of the DRX cycle. The terminal monitors a physical downlink control channel (PDCCH) within an active time, and other time is a sleep time. As a result, the terminal does not know how to perform positioning measurement in a DRX scenario.

SUMMARY

According to a first aspect, a positioning method is provided and is performed by a terminal. The method includes:

receiving discontinuous reception DRX configuration information;

obtaining positioning configuration information, where the positioning configuration information includes at least one of positioning reference signal PRS configuration information or positioning state information (PSI) configuration information; and performing a corresponding positioning behavior according to the DRX configuration information and the positioning configuration information, where the positioning behavior includes at least one of a positioning measurement behavior or a positioning reporting behavior.

According to a second aspect, a positioning apparatus is provided, including:

a first receiving module, configured to receive discontinuous reception DRX configuration information;

a first obtaining module, configured to obtain positioning configuration information, where the positioning configuration information includes at least one of positioning reference signal PRS configuration information or positioning state information PSI configuration information; and a first processing module, configured to perform a corresponding positioning behavior according to the DRX configuration information and the positioning configuration information, where the positioning behavior includes at least one of a positioning measurement behavior or a positioning reporting behavior.

According to a third aspect, a terminal is provided. The terminal includes a processor, a memory, and a program or an instruction that is stored in the memory and that can be run on the processor, where when the program or the instruction is executed by the processor, the steps of the method in the first aspect are implemented.

According to a fourth aspect, an information transmission method is provided and is performed by a serving base station. The method includes:

sending indication signaling to a location server or a neighboring cell base station, where the indication signaling includes at least one of the following:

information used to indicate a discontinuous reception DRX configuration parameter;

information used to indicate whether a DRX on-duration timer is started in a next DRX cycle; or information used to indicate changing a DRX state.

According to a fifth aspect, an information transmission apparatus is provided, including:

a sending module, configured to send indication signaling to a location server or a neighboring cell base station, where the indication signaling includes at least one of the following:

information used to indicate a discontinuous reception DRX configuration parameter; or information used to indicate whether a DRX on-duration timer is started in a next DRX cycle; or information used to indicate changing a DRX state.

According to a sixth aspect, a serving base station is provided, including a processor, a memory, and a program or an instruction that is stored in the memory and that can be run on the processor, where when the program or the instruction is executed by the processor, the steps of the method in the fourth aspect are implemented.

According to a seventh aspect, a non-transitory readable storage medium is provided. The non-transitory readable storage medium stores a program or an instruction, and when the program or the instruction is executed by a processor, the steps of the method in the first aspect or the steps of the method in the fourth aspect are implemented.

According to an eighth aspect, a chip is provided. The chip includes a processor and a communications interface, the communications interface is coupled to the processor, and the processor is configured to run a program or an instruction to implement the method in the first aspect or the method in the fourth aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a new radio (NR) system for example purposes, and NR terms are used in most of the following descriptions, but these technologies can also be applied to an application other than an NR system application, for example, a 6$^{th}$ generation (6G) communications system.

Figure 1:
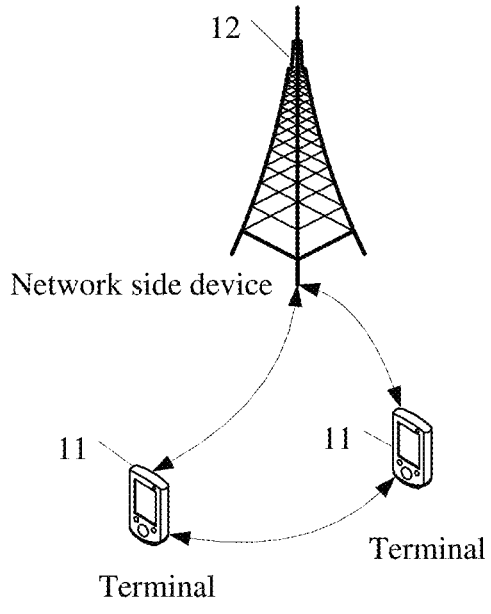
FIG. 1 is a schematic diagram of a communications system to which embodiments of this application can be applied.

FIG. 1 is a block diagram of a wireless communications system to which embodiments of this application can be applied. The wireless communications system includes a terminal 11 and a network side device 12. The terminal 11 may also be referred to as a terminal device to user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a bracelet, a headset, and glasses. It should be noted that a type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set ESS), a NodeB, an evolved NodeB (eNB), a home NodeB, a home evolved NodeB, a WLAN access point, a Wi-Fi node, a transmitting receiving point (TRP), or another appropriate term in the art. As long as a same technical effect is achieved, the base station is not limited to a technical term. It should be noted that, in the embodiments of this application, only a base station in an NR system is used as an example, but a type of the base station is not limited. The core network device may be a location server, may be a location server in LTE (E-SMLC), may be a location server in NR (LMF), or may be a location server in a subsequent evolved version.

To resolve a positioning problem in a DRX scenario, an embodiment of this application provides a positioning method, including: receiving DRX configuration information, and performing a corresponding positioning behavior according to the DRX configuration information, where the positioning behavior includes a positioning measurement behavior or a positioning reporting behavior. Illustratively, the terminal may determine, based on the DRX configuration information, whether to perform the positioning measurement behavior or the positioning reporting behavior within a DRX inactive time or active time. The positioning measurement behavior may also be referred to as PRS measurement, and the positioning reporting behavior may also be referred to as PSI reporting or PSI report reporting.

Content of the positioning state information in this embodiment of this application may include at least one of the following: a location estimation result, positioning event information, a positioning measurement result, or other positioning state information.

Optionally, the other positioning state information may include information used to indicate a positioning state update, information used to indicate whether a positioning configuration is appropriate, other information related to positioning reporting, and the like. For example, the other positioning state information includes but is not limited to at least one of the following:

a spatial relationship, where it should be noted that the spatial relationship may be a spatial relationship of an uplink positioning signal, or may be a spatial relationship of a downlink positioning signal, for example, the other positioning state information may include information indicating that a positioning relationship is appropriate, or information indicating that a positioning relationship is inappropriate;

positioning assistance information, for example, the other positioning state information may include information indicating that the positioning assistance information is appropriate, or information indicating that the positioning assistance information is inappropriate, where in a case that the other positioning state information indicates that the positioning assistance information is inappropriate, the other positioning state information may be further used to request a update, that is, a serving base station or a location server may update the positioning assistance information based on the other positioning state information;

related information of a path loss reference signal, for example, the related information of the path loss reference signal indicates that the path loss reference signal cannot be measured;

a resource request, where the resource request may include a resource request of positioning information and/or a resource request of a positioning signal; and it should be noted that, the resource request may indicate that a resource is used for positioning or used for positioning information, and further, the resource request may indicate a type of positioning information for which the resource is used;

a resource request size, where the resource request size indicates a resource size required by a terminal on a network side;

a type of reported location information;

information indicating that resources are insufficient;

information indicating that a positioning signal or positioning assistance information is not received;

information indicating that no sufficient positioning signals or positioning assistance information are received;

relationship information between a reporting resource and a measurement window, where the relationship information may indicate that the reporting resource matches the measurement window, or indicate that the reporting resource does not match the measurement window, or indicate time offset information; and it should be noted that when a reporting resource configured for a base station does not match a measurement window or a reporting resource does not match a measurement reporting time, the base station is notified of a corresponding offset;

relationship information between a reporting resource and a measurement time, where the relationship information may indicate that the reporting resource matches the measurement time, or indicate that the reporting resource does not match the measurement time, or indicate time offset information; and it should be noted that when a reporting resource configured for a base station does not match a measurement time or a reporting resource does not match a measurement reporting time, the base station is notified of a corresponding offset; or hybrid automatic repeat request HARQ information.

The positioning event information includes but is not limited to at least one of area event information, motion event information, or UE availability. Illustratively, the area event information is an event in which the UE enters, leaves, or stays in a predefined geographical area; the motion event information is an event in which the UE moves from a previous location beyond a predefined straight line distance; the UE availability is any event in which a 5G core network establishes a connection with the UE.

The positioning measurement result and/or the location estimation result may be a current measurement result and/or location estimation, for example, a measurement result and/or a location estimation that are/is latest obtained after trigger signaling is received; may be a last known measurement result and/or location estimation, for example, a recent measurement result and/or location estimation before trigger signaling is received; or may be an initial measurement result/or location estimation, for example, a measurement result and/or a location estimation in a start phase of call setup in an emergency positioning case; or may be a measurement result and/or a location estimation in a measurement time window. No enumeration is provided herein.

Optionally, the positioning measurement result and the location estimation result may be obtained by using a positioning technology such as an observed time difference of arrival (OTDOA), a global navigation satellite system (GNSS), a downlink time difference of arrival (DL-TDOA), an uplink time difference of arrival (UL-TDOA), an uplink angle of arrival (AoA), an angle of departure (AoD), Bluetooth, a sensor, or Wi-Fi.

Optionally, physical channels selected by different positioning state information may be different. For example, less information content (for example, absolute location information, event information, or other positioning state information) may be mapped to a PUCCH, and other information or more bits (for example, location measurement information) may only be mapped to a PUSCH.

With reference to the accompanying drawings, a positioning method provided in the embodiments of this application is described in detail by using some embodiments and application scenarios.

Figure 2:
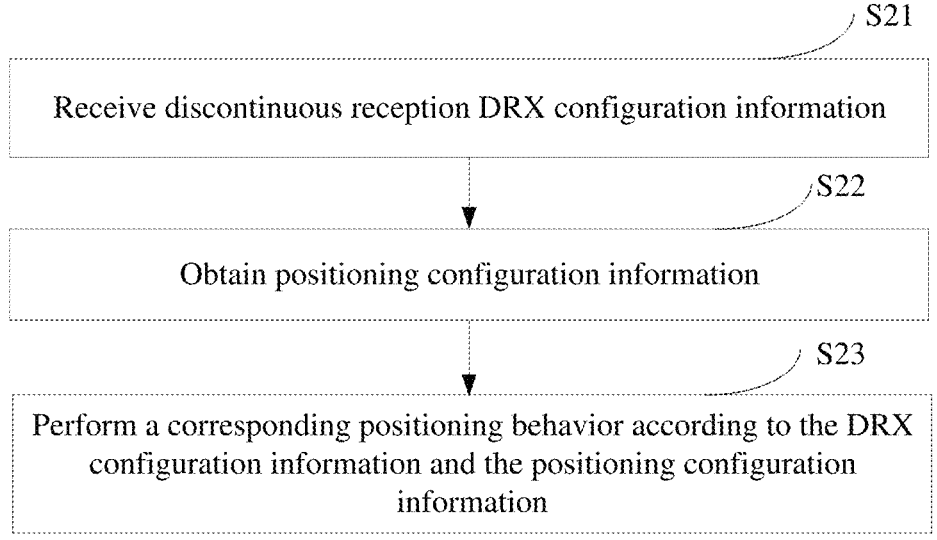
FIG. 2 is a schematic flowchart of a positioning method according to an embodiment of this application.

As shown in FIG. 2, a positioning method in an embodiment of this application is performed by a terminal and includes at least the following steps.

Step 21: Receive discontinuous reception DRX configuration information.

The DRX configuration information carries related information of a DRX cycle, and the terminal may monitor a PDCCH during on duration of the DRX cycle. Different DRX cycles may be configured according to different service models, such as a short DRX cycle or a long DRX cycle. The DRX configuration information includes a DRX-related timer, for example:

DRX on-duration timer: Once the timer is started, the timer is not allowed to restart during duration in which the terminal monitors a PDCCH in one DRX cycle.

DRX inactivity timer: During duration in which a PDCCH needs to be monitored after a newly transmitted PDCCH is received, the timer is started or restarted on a first symbol after receiving of the newly transmitted PDCCH (uplink UL or downlink DL) ends. The timer is stopped when a DRX command Media Access Control control element (MAC CE) is received.

DRX downlink retransmission timer/DRX uplink retransmission timer: The timer is each hybrid automatic repeat request (Hybrid ARQ, HARQ) process (per HARQ Process) parameter, indicating the maximum number of PDCCH slots (slot) that the terminal needs to continuously monitor to receive expected downlink retransmission data. The Timer starts at a first symbol after a DRX HARQ round-trip time (RTT) timer (drx-HARQ-RTT-Timer) expires. The timer is stopped when a PDCCH indicating downlink retransmission is received.

A DRX long cycle start offset may represent two meanings: a long DRX cycle and a DRX start offset. If a short DRX cycle parameter is also configured on a network side, the long DRX cycle must be configured as an integer multiple of the short DRX cycle.

Drx-ShortCycle: a length of a DRX short cycle.

DRX short cycle timer: The timer is used to indicate how many short cycles it lasts to enter a long cycle without receiving a PDCCH. When the drx-inactivityTimer expires and the drx-ShortCycleTimer is started when a short cycle is configured, a length of the timer is an integer multiple of the short cycle.

DRX downlink HARQ round-trip time timer/DRX uplink HARQ round-trip time timer (drx-HARQ-RTT-TimerUL): The timer is a per HARQ process parameter, indicating a minimum time gap for waiting for retransmission. The timer is started in a first symbol after sending of an ACK/NACK ends. During running of the timer, corresponding MAC does not monitor the PDCCH. When the timer expires, drx-Retransmission-TimerDL corresponding to the HARQ process is started.

To enable the terminal to enter a sleep state as quickly as possible, a (long) DRX command MAC CE ((Long) DRX Command MAC CE) is introduced. The (Long) DRX command MAC CE may be used to stop the drx-ShortCycleTimer and enter a DRX long cycle. The DRX command MAC CE may be used to stop the drx-InactivityTimer. If a DRX short cycle is configured, the DRX short cycle is entered; otherwise, the DRX long cycle is entered.

In a DRX scenario, a DRX active time and a DRX inactive time (or referred to as a sleep time) exist, and the DRX inactive time may be determined according to the DRX configuration information. After DRX is configured, the terminal monitors a PDCCH at the DRX active time, and other time is the DRX inactive time. The DRX active time includes a running period of a related timer configured in the DRX configuration information, for example, drx-onDurationTimer, drx-InactivityTimer, drx-RetransmissionTimerDL, and drx-RetransmissionTimerUL. In addition, the DRX active time may further include: a time determined according to a behavior of the terminal at a MAC layer, for example, the terminal initiates CBRA to start a contention random access resolution timer (ra-ContentionResolutionTimer) when contention conflict resolution is not completed, or a time determined based on an SR related configuration of waiting duration when the terminal sends a schedule request (SR) on a physical uplink control channel (PUCCH) to wait for uplink scheduling, or a time for which the UE waits for new scheduling (usually downlink scheduling) of a PDCCH (for example, a PDCCH scrambled by using a cell radio network temporary identity (C-RNTI)) after random access succeeds in a PDCCH order procedure.

Step 22: Obtain positioning configuration information, where the positioning configuration information includes at least one of positioning reference signal PRS configuration information or positioning state information PSI configuration information.

It should be noted that the positioning configuration information herein may be received from the serving base station or the location server, or may be stipulated in a protocol. The PRS configuration information may include related information of a PRS, and the PSI configuration information may include related information of PSI report reporting.

Step 23: Perform a corresponding positioning behavior according to the DRX configuration information and the positioning configuration information, where the positioning behavior includes at least one of a positioning measurement behavior or a positioning reporting behavior.

It is determined, according to the DRX configuration information and the positioning configuration information, whether to perform corresponding PRS measurement or PSI reporting in a DRX cycle. For example, when power saving is preferentially ensured, corresponding PRS measurement or PSI reporting is not performed in the DRX cycle, to reduce an unnecessary positioning process and save power. Alternatively, when positioning of the terminal is preferably ensured, corresponding PRS measurement or PSI reporting is properly performed in the DRX cycle, to ensure timely or accurate positioning of the terminal.

The following embodiments of this application further describe the positioning behavior of the terminal with reference to some examples.

1. In a case that the positioning behavior includes the positioning measurement behavior, step 23 includes but is not limited to the following implementations:

Manner 1: Not perform the positioning measurement behavior within a DRX inactive time. In this manner, PRS measurement is not performed within the DRX inactive time.

The DRX inactive time may be a time other than the DRX active time.

This manner may include but is not limited to the following several implementations:

Implementation 1: No PRS measurement is performed within the DRX inactive time. For example, within the DRX inactive time, the UE does not measure all PRSs such as an aperiodic PRS, a semi-persistent PRS, a periodic PRS, and an on demand PRS.

Implementation 2: PRS measurement is not performed within the DRX inactive time in some conditions. The condition described herein may be related to a measurement gap (MG), indication information, sleep indication information (for example, a wake-up signal (WUS)), or the like. Implementation 2 may be implemented with reference to the following manners:

2.1. If a measurement gap request is not sent to the serving base station, not perform the positioning measurement behavior within the DRX inactive time indicated by the DRX configuration information. If the UE does not request an MG, the UE does not perform PRS measurement within the inactive time.

2.2. If the terminal is not configured with a measurement gap, not perform the positioning measurement behavior within the DRX inactive time indicated by the DRX configuration information. If the UE is not configured with the MG, the UE does not perform PRS measurement within the inactive time.

2.3. If the measurement gap request is sent to the serving base station but the terminal is not configured with the measurement gap, not perform the positioning measurement behavior within the DRX inactive time indicated by the DRX configuration information. If the UE requests the MG from a serving gNB but is not configured with the MG, the UE does not perform PRS measurement within the inactive time.

2.4. If the measurement gap request is sent to the serving base station and second feedback information fed back by the serving base station is received, not perform the positioning measurement behavior within the DRX inactive time indicated by the DRX configuration information, where the second feedback information is used to indicate that the terminal cannot perform the positioning measurement behavior within the DRX inactive time. After the UE requests the MG from the serving gNB, the serving gNB feeds back indication information to the UE to indicate whether the UE can perform PRS measurement within the inactive time. If the indication information that is fed back is the second feedback information, the UE does not perform PRS measurement within the DRX inactive time.

Optionally, the measurement gap request information may include a request for performing PRS measurement within the DRX inactive time. The second feedback information may include information indicating whether the measurement gap is configured.

2.5. If an indication signal indicating sleep is monitored, not perform the positioning measurement behavior during running of the DRX on-duration timer outside the DRX active time. When the UE needs to perform PRS measurement, if the drx-onDurationTimer is not started when the UE is configured with DRX and is configured with a monitoring DCI format 2-6, the UE outside the active time does not perform PRS measurement within a time indicated by the drx-onDuration-Timer outside the active time. 1-bit information included in the DCI format 2-6 is used to indicate whether the terminal starts the drx-onDurationTimer. When a value of the bit is 0, the terminal does not start the drx-onDurationTimer. When the value of the bit is 1, the terminal starts the drx-onDurationTimer.

2.6. If an indication signal indicating sleep is monitored, not perform the positioning measurement behavior during running of the DRX on-duration timer outside the DRX active time based on fourth indication information, where the fourth indication information is used to indicate that the positioning measurement behavior cannot be performed during running of the DRX on-duration timer outside the DRX active time. In addition to the indication signal, a parameter indication manner is further used to determine whether to perform PRS measurement. For example, according to a parameter indication of a network device, the UE measures a PRS within the time indicated by the drx-onDurationTimer outside the active time. The parameter indication may be a switch. For example, when an IE corresponding to the parameter indication exists (or is "true" or "1"), the UE may measure a PRS within the time indicated by the drx-onDurationTimer outside the active time. Otherwise, the UE cannot measure a PRS within the time indicated by the drx-onDurationTimer outside the active time. Alternatively, when the parameter indication is "1", the UE may measure a PRS within the time indicated by the drx-onDurationTimer outside the active time; or when the parameter indication is "0", that is, the fourth indication information, the UE cannot measure a PRS within the time indicated by the drx-onDurationTimer outside the active time.

Manner 2: Perform the positioning measurement behavior according to the PRS configuration information within the DRX inactive time.

This manner may include but is not limited to the following several implementations:

Implementation 1: Perform all PRS measurement within the DRX inactive time. In this implementation, all PRSs are measured according to the PRS configuration information within the DRX inactive time. That is, PRS measurement performed by the UE is not related to DRX. The UE also performs PRS measurement within the inactive time.

Implementation 2: Perform specified PRS measurement within the DRX inactive time. For example, a PRS of a first type is measured according to the PRS configuration information within the DRX inactive time and a PRS of a second type is not measured.

The PRS of the first type is an on demand PRS, and the PRS of the second type is an aperiodic PRS, a semi-persistent PRS, or a periodic PRS. That is, within the DRX inactive time, the UE measures only the on demand PRS and does not measure the periodic PRS, the aperiodic PRS, or the semi-persistent PRS.

Alternatively, the PRS of the first type is an aperiodic PRS, and the PRS of the second type is a semi-persistent PRS or a periodic PRS. That is, within the DRX inactive time, the UE measures only the aperiodic PRS and does not measure the periodic PRS or the semi-persistent PRS.

Alternatively, the PRS of the first type is an aperiodic PRS or a semi-persistent PRS, and the PRS of the second type is a periodic PRS. That is, within the DRX inactive time, the UE measures only the aperiodic PRS or the semi-persistent PRS and does not measure the periodic PRS.

Optionally, when requirements (or types) of on demand PRSs are different, PRS measurement may be performed within the inactive time according to the different types. For example, if a requirement of an on demand PRS is high precision, the on demand PRS is measured within the inactive time. If the requirement of the on demand PRS is a low latency, the on demand PRS is measured within the inactive time. If the requirement of the on demand PRS is a low power of the terminal (or power saving of the terminal and efficiency of the terminal), the on demand PRS is not measured within the inactive time.

Implementation 3: PRS measurement is performed within the DRX inactive time in some conditions. The condition herein may be related to a measurement gap, indication information, sleep indication information, or the like. Implementation 3 may be implemented with reference to the following manners:

3.1. Measure, according to the PRS configuration information within the DRX inactive time, a PRS whose positioning priority is greater than or equal to the preset threshold. In this implementation, the positioning method further includes: obtaining positioning priority information, where the positioning priority information includes a measurement priority of a target PRS, and the target PRS includes at least one of an aperiodic PRS, a semi-persistent PRS, a periodic PRS, or an on demand PRS. That is, when the UE needs to perform PRS measurement, a relationship between PRS measurement and DRX further includes: before performing PRS measurement, the UE obtains priority information of PRS measurement, and performs PRS measurement according to the priority information. The positioning priority information may be a priority level of a current positioning service, for example, the current positioning service has a relatively high precision level requirement, or a low latency requirement, or is on demand positioning. The positioning priority information may be indicated by a network side device (for example, the serving base station or the location server), for example, a protocol specifies a plurality of priority levels, and the network indicates one of the priority levels to the UE. Illustratively, in this manner, the performing PRS measurement according to the priority information includes: The protocol stipulates or the network indicates that when the priority level is higher than (or not lower than) a threshold, the UE may perform PRS measurement within the inactive time. The priority threshold may be indicated by the network device, stipulated in the protocol, or selected by the terminal.

Optionally, the PRS whose positioning priority is greater than or equal to the preset threshold is measured according to the PRS configuration information within the DRX inactive time. The positioning priority may be alternatively at least one of the following priorities: a priority of a positioning frequency layer, a priority of a TRP in the positioning frequency layer, a priority of a PRS resource set in the TRP, a priority of a PRS resource in the PRS resource set, a priority of a TRP, and the like. The UE measures, according to a priority within the inactive time, only a PRS corresponding to a positioning frequency layer, a TRP, a PRS resource set, or a PRS resource whose priority is higher than or equal to a threshold.

3.2. If an indication signal indicating sleep is monitored, perform the positioning measurement behavior during running of the DRX on-duration timer outside the DRX active time based on third indication information, where the third indication information is used to indicate that the positioning measurement behavior is supported to be performed during running of the DRX on-duration timer outside the DRX active time. In addition to the indication signal, a parameter indication manner is further used to determine whether to perform PRS measurement. For example, according to a parameter indication of a network device, the UE measures a PRS within the time indicated by the drx-onDuration-Timer outside the active time. The parameter indication may be a switch. For example, when an IE corresponding to the parameter indication exists (or is "true" or "1"), that is, the third indication information is obtained, the UE may measure a PRS within the time indicated by the drx-onDurationTimer outside the active time. Otherwise, the UE cannot measure a PRS within the time indicated by the drx-onDurationTimer outside the active time, that is, the UE cannot measure a PRS within the time indicated by the drx-onDurationTimer outside the active time by default. Alternatively, when the parameter indication is "1", that is, the third indication information is obtained, the UE may measure a PRS within the time indicated by the drx-onDurationTimer outside the active time; or when the parameter indication is "0", the UE cannot measure a PRS within the time indicated by the drx-onDurationTimer outside the active time.

In addition, when the UE needs to perform PRS measurement, the relationship between PRS measurement and DRX further includes: performing PRS measurement according to a relationship between a measurement gap and positioning measurement. The PRS may be one of a periodic PRS, an aperiodic PRS, and a semi-persistent PRS. This implementation may further include at least one of the following:

3.3. If the terminal is configured with a measurement gap, perform the positioning measurement behavior according to the PRS configuration information within the DRX inactive time. That is, if the UE is configured with the MG, the UE may perform PRS measurement within the inactive time.

3.4. If the terminal sends a measurement gap request to a serving base station and the terminal is configured with the measurement gap, perform the positioning measurement behavior according to the PRS configuration information within the DRX inactive time. That is, if the UE requests the MG from the serving gNB and is configured with the MG, the UE may perform PRS measurement within the inactive time.

3.5. If the terminal does not send the measurement gap request to the serving base station, perform the positioning measurement behavior according to the PRS configuration information within the DRX inactive time. That is, if the UE does not request the MG, the UE performs PRS measurement within the inactive time.

3.6. If the measurement gap request is sent to the serving base station and first feedback information fed back by the serving base station is received, perform the positioning measurement behavior according to the PRS configuration information within the DRX inactive time, where the first feedback information is used to indicate that the terminal can perform the positioning measurement behavior within the DRX inactive time. In this manner, after the UE requests the MG from the serving gNB, the serving gNB feeds back indication information to the UE to indicate whether the UE can perform PRS measurement within the inactive time. When the indication information that is fed back is the first feedback information, the UE performs PRS measurement within the DRX inactive time.

It should be noted that, when the measurement gap is configured, the step of performing the positioning measurement behavior according to the PRS configuration information within the DRX inactive time may include: performing the positioning measurement behavior according to the PRS configuration information within a measurement gap window in the DRX inactive time, where the measurement gap window is determined according to the measurement gap. That is, the UE performs PRS measurement only in an MG time window.

Optionally, the measurement gap request information may include a request for performing PRS measurement within the DRX inactive time. The first feedback information may include information indicating whether the measurement gap is configured.

Implementation 4: When the UE needs to perform PRS measurement, the UE may perform PRS measurement according to a relationship between positioning BWP switching and positioning measurement. The PRS may be one of a periodic PRS, an aperiodic PRS, and a semi-persistent PRS. This implementation may further include at least the following: If the UE is instructed by the network to be switched to a positioning BWP to perform PRS measurement, the UE may perform PRS measurement within the inactive time. The positioning BWP may be a BWP illustratively used for positioning measurement.

Manner 3: Determine, according to indication information, whether the positioning measurement behavior is supported to be performed within the DRX inactive time, where the indication information includes first indication information indicating that the positioning measurement behavior can be performed within the DRX inactive time or second indication information indicating that the positioning measurement behavior cannot be performed within the DRX inactive time.

In this manner, the network indication (for example, a "switch") may indicate whether a PRS can be measured within the inactive time. The PRS may be one of a periodic PRS, an aperiodic PRS, and a semi-persistent PRS. Illustratively, a PRS is not measured within the inactive time by default. If the network indication is received, the UE may perform PRS measurement within the inactive time. Alternatively, when the parameter indication is "1", that is, the first indication information is obtained, the UE may measure a PRS within the time indicated by the drx-onDurationTimer outside the active time; or when the parameter indication is "0", that is, the second indication information is obtained, the UE cannot measure a PRS within the time indicated by the drx-onDurationTimer outside the active time.

Manner 4: Perform the positioning measurement behavior according to the PRS configuration information within a DRX active time indicated by the DRX configuration information. In this manner, a positioning behavior of the terminal is normally performed without being affected by a DRX configuration within the DRX active time.

The foregoing describes some implementations in which the positioning behavior is the positioning measurement behavior. The following embodiments of this application further describe implementations in which the positioning behavior is the positioning reporting behavior.

2. When the positioning behavior includes the positioning reporting behavior, step 23 includes but is not limited to the following implementations:

Manner 5: Not perform the positioning reporting behavior within the DRX inactive time. In this manner, PRS reporting is not performed within the DRX inactive time.

This manner may include but is not limited to the following several implementations:

Implementation 1: No PSI reporting is performed within the DRX inactive time. For example, within the DRX inactive time, the UE does not report any one of an aperiodic PSI, semi-persistent PSI, periodic PSI, on-demand PSI, PSI on a PUSCH, PSI on a PUCCH, aperiodic PSI on a PUSCH, semi-persistent PSI on a PUSCH, semi-persistent PSI on a PUCCH, periodic PSI on a PUCCH, periodic PSI on a PUSCH, or the like.

Implementation 2: PSI reporting is not performed within the DRX inactive time in some conditions. The condition herein may be related to indication information, sleep indication information, or the like. Implementation 2 may be implemented with reference to the following manners:

2.1. If an indication signal indicating sleep is monitored, not perform the positioning reporting behavior during running of the DRX on-duration timer outside the DRX active time. When the UE needs to perform PSI reporting, if the drx-onDurationTimer is not started when the UE is configured with DRX and is configured with a monitoring DCI format 2-6, the UE outside the active time does not report PSI within the time indicated by the drx-onDurationTimer outside the active time.

2.2. If an indication signal indicating sleep is monitored, not perform the positioning reporting behavior during running of the DRX on-duration timer outside the DRX active time based on eighth indication information, where the eighth indication information is used to indicate that the positioning reporting behavior is not supported to be performed during running of the DRX on-duration timer outside the DRX active time. In addition to the indication signal, a parameter indication manner is further used to determine whether to perform PSI reporting. For example, according to a parameter indication of a network device, the UE reports PSI within the time indicated by the drx-onDurationTimer outside the active time. The parameter indication may be a switch. For example, when an IE corresponding to the parameter indication exists (or is "true" or "1"), that is, the UE may report PSI within the time indicated by the drx-onDurationTimer outside the active time. Otherwise, the UE cannot report PSI within the time indicated by the drx-onDurationTimer outside the active time, that is, the UE cannot report PSI within the time indicated by the drx-onDurationTimer outside the active time by default. Alternatively, when the parameter indication is "1", the UE may report PSI within the time indicated by the drx-onDurationTimer outside the active time; or if the parameter indication is "0", that is, the eighth indication information, the UE cannot report PSI within the time indicated by the drx-onDuration-Timer outside the active time.

Manner 6: Perform the positioning reporting behavior according to the PSI configuration information within the DRX inactive time.

This manner may include but is not limited to the following several implementations:

6.1. Report all PSI according to the PSI configuration information within the DRX inactive time. In this implementation, all PSI is reported according to the PSI configuration information within the DRX inactive time. That is, PSI reporting performed by the UE is not related to DRX. The UE also performs PSI reporting within the inactive time.

6.2. Perform particular PSI reporting within the DRX inactive time. For example, PSI of a third type is reported according to the PSI configuration information within the DRX inactive time and PSI of a fourth type is not reported.

The PSI of the third type is on demand PSI, and the PSI of the fourth type is aperiodic PSI, semi-persistent PSI, or periodic PSI. That is, within the DRX inactive time, the UE reports only the on-demand PSI, and does not report the aperiodic PSI, the semi-persistent PSI, or the periodic PSI.

Alternatively, the PSI of the third type is aperiodic PSI, and the PSI of the fourth type is periodic PSI or semi-persistent PSI. That is, within the DRX inactive time, the UE reports only the aperiodic PSI, and does not report the periodic PSI or the semi-persistent PSI.

Alternatively, the PSI of the third type is aperiodic PSI or semi-persistent PSI, and the PSI of the fourth type is periodic PSI. That is, within the DRX inactive time, the UE reports only the aperiodic PSI or the semi-persistent PSI, and does not report the periodic PSI.

Alternatively, the PSI of the third type is aperiodic PSI on a physical uplink shared channel PUSCH, and the PSI of the fourth type is semi-persistent PSI on a PUSCH, semi-persistent PSI on a physical uplink control channel PUCCH, periodic PSI on a PUCCH, or periodic PSI on a PUSCH. That is, within the DRX inactive time, the UE reports only the aperiodic PSI on the PUSCH, and does not report the semi-persistent PSI on the PUSCH, the semi-persistent PSI on the physical uplink control channel PUCCH, the periodic PSI on the PUCCH, or the periodic PSI on the PUSCH.

Alternatively, the PSI of the third type is aperiodic PSI on a PUSCH or semi-persistent PSI on a PUSCH, and the PSI of the fourth type is semi-persistent PSI on a PUCCH, periodic PSI on a PUCCH, or periodic PSI on a PUSCH. That is, within the DRX inactive time, the UE reports only the aperiodic PSI on the PUSCH or the semi-persistent PSI on the PUSCH, and does not report the semi-persistent PSI on the PUCCH, the periodic PSI on the PUCCH, or the periodic PSI on the PUSCH.

Alternatively, the PSI of the third type is aperiodic PSI on a PUSCH, semi-persistent PSI on a PUSCH, or periodic PSI on a PUSCH, and the PSI of the fourth type is semi-persistent PSI on a PUCCH or periodic PSI on a PUCCH. That is, within the DRX inactive time, the UE reports only the aperiodic PSI on the PUSCH, or the semi-persistent PSI on the PUSCH, or the periodic PSI on the PUSCH, and does not report the semi-persistent PSI on the PUCCH or the periodic PSI on the PUCCH.

Alternatively, the PSI of the third type is PSI on a PUSCH, and the PSI of the fourth type is PSI on a PUCCH. That is, within the DRX inactive time, the UE reports only the PSI on the PUSCH, and does not report the PSI on the PUCCH.

Alternatively, the PSI of the third type is PSI on a PUCCH, and the PSI of the fourth type is PSI on a PUSCH. That is, within the DRX inactive time, the UE reports only the PSI on the PUCCH, and does not report the PSI on the PUSCH.

Alternatively, the PSI of the third type is at least one of aperiodic PSI on a dynamic grant PUSCH, semi-persistent PSI on a dynamic grant PUSCH, periodic PSI on a dynamic grant PUSCH, aperiodic PSI on a grant-free PUSCH, semi-persistent PSI on a grant-free PUSCH, periodic PSI on a grant-free PUSCH, semi-persistent PSI on a PUCCH, or periodic PSI on a PUCCH, and the fourth type is PSI of a remaining type other than the third type.

Alternatively, the PSI of the third type is at least one of aperiodic PSI on a dynamic grant PUSCH, semi-persistent PSI on a dynamic grant PUSCH, aperiodic PSI on a grant-free type 1 PUSCH, semi-persistent PSI on a grant-free type 1 PUSCH, periodic PSI on a grant-free type 1 PUSCH, aperiodic PSI on a grant-free type 2 PUSCH, semi-persistent PSI on a grant-free type 2 PUSCH, periodic PSI on a grant-free type 2 PUSCH, semi-persistent PSI on a PUCCH, or periodic PSI on a PUCCH, and the fourth type is PSI of a remaining PSI other than the third type.

6.3. Report, according to the PSI configuration information within the DRX inactive time, PSI whose reporting priority is greater than or equal to the preset threshold. In this implementation, the positioning method further includes: obtaining positioning priority information, where the positioning priority information includes a measurement priority of a target PRS, and the target PRS includes at least one of an aperiodic PRS, a semi-persistent PRS, a periodic PRS, or an on demand PRS. The step of reporting, according to the PSI configuration information within the DRX inactive time, PSI whose reporting priority is greater than or equal to the preset threshold includes: reporting, according to the PSI configuration information within the DRX inactive time, PSI corresponding to positioning measurement whose positioning priority is greater than or equal to a first threshold. Alternatively, the method further includes: obtaining reporting priority information, where the reporting priority information includes a reporting priority of target PSI, and the target PSI includes at least one of an aperiodic PSI, semi-persistent PSI, periodic PSI, on-demand PSI, PSI on a PUSCH, PSI on a PUCCH, aperiodic PSI on a PUSCH, semi-persistent PSI on a PUSCH, semi-persistent PSI on a PUCCH, periodic PSI on a PUCCH, periodic PSI on a PUSCH, aperiodic PSI on a dynamic grant PUSCH, semi-persistent PSI on a dynamic grant PUSCH, periodic PSI on a dynamic grant PUSCH, aperiodic PSI on a grant-free PUSCH, semi-persistent PSI on a grant-free PUSCH, periodic PSI on a grant-free PUSCH, aperiodic PSI on a grant-free type 1 PUSCH, semi-persistent PSI on a grant-free type 1 PUSCH, periodic PSI on a grant-free type 1 PUSCH, aperiodic PSI on a grant-free type 2 PUSCH, semi-persistent PSI on a grant-free type 2 PUSCH, or periodic PSI on a grant-free type 2 PUSCH. The step of reporting, according to the PSI configuration information within the DRX inactive time, PSI whose reporting priority is greater than or equal to a preset threshold includes: reporting, according to the PSI configuration information within the DRX inactive time, PSI whose reporting priority is greater than or equal to a second threshold.

Optionally, in the step of reporting, according to the PSI configuration information within the DRX inactive time, PSI whose reporting priority is greater than or equal to a preset threshold, the positioning priority may be alternatively the following priority: a priority allocated according to PSI content, for example, a priority of location estimation, a location measurement result, or event information is higher than a priority of other information.

Optionally, if PSI includes a positioning measurement result and/or a location estimation result, and the positioning measurement result and/or the location result are/is associated with measurement of a PRS, the priority information may be further used for measurement of the PRS. The UE performs measurement on the associated PRS according to the same priority information and the DRX configuration information. For example, if a priority of PSI is higher (or higher than the preset threshold), a priority of a PRS associated with the PSI is also higher (or higher than the preset threshold), and measurement may be performed within the inactive time.

6.4. If an indication signal indicating sleep is monitored, perform the positioning reporting behavior during running of the DRX on-duration timer outside the DRX active time based on seventh indication information, where the seventh indication information is used to indicate that the positioning reporting behavior is supported to be performed during running of the DRX on-duration timer outside the DRX active time. In addition to the indication signal, a parameter indication manner is further used to determine whether to perform PSI reporting. For example, according to a parameter indication by a network device, the UE measures a PRS within the time indicated by the drx-onDurationTimer outside the active time. The parameter indication may be a switch. For example, when an IE corresponding to the parameter indication exists (or is "true" or "1"), that is, the seventh indication information is obtained, the UE may report PSI within the time indicated by the drx-onDurationTimer outside the active time. Otherwise, the UE cannot report PSI within the time indicated by the drx-onDurationTimer outside the active time. Alternatively, when the parameter indication is "1", that is, the seventh indication information is obtained, the UE may report PSI within the time indicated by the drx-onDurationTimer outside the active time; or when the parameter indication is "0", the UE cannot report PSI within the time indicated by the drx-onDurationTimer outside the active time.

Manner 7: Determine, according to indication information, whether the positioning reporting behavior is supported to be performed within the DRX inactive time, where the indication information includes fifth indication information indicating that the positioning reporting behavior is supported to be performed within the DRX inactive time or sixth indication information indicating that the positioning reporting behavior is not supported to be performed within the DRX inactive time.

In this manner, the network indication (for example, a "switch") may indicate whether PSI can be reported within the inactive time. For example, PSI is not reported within the inactive time by default. If the network indication is received, that is, the fifth indication information is obtained, the UE may perform PRS measurement within the inactive time. Alternatively, when the parameter indication is "1", that is, the fifth indication information is obtained, the UE may report PSI within the time indicated by the drx-onDurationTimer outside the active time; or when the parameter indication is "0", that is, the sixth indication information is obtained, the UE cannot measure a PRS within the time indicated by the drx-onDurationTimer outside the active time.

Manner 8: Perform the positioning reporting behavior according to the PSI configuration information within the DRX active time indicated by the DRX configuration information. In this manner, a positioning reporting behavior of the terminal is normally performed without being affected by a DRX configuration within the DRX active time.

Manner 9: Perform the positioning reporting behavior if positioning measurement associated with the positioning reporting behavior meets a target time requirement; otherwise, not performing the positioning reporting behavior. In other words, if the positioning measurement associated with the positioning reporting behavior does not meet the target time requirement, the positioning reporting behavior is not performed, regardless of whether the positioning reporting is within the active time or outside the active time.

Optionally, the positioning reporting behavior is performed if the positioning measurement is performed before a first downlink moment prior to a PSI reporting time, where an interval between the first downlink moment and the PSI reporting time is first preset duration, and the positioning measurement includes positioning measurement within an active time or an inactive time in a DRX cycle indicated by the DRX configuration information. PSI includes a positioning measurement result and/or a location estimation result, and the positioning measurement result and/or the location estimation result are/is associated with measurement of a PRS. When a PRS in at least one cycle is measured before a downlink moment A that is not later than PSI reporting, the PSI is reported (or the PSI is not dropped); otherwise, the PSI is dropped. That a PRS in at least one cycle is measured before a downlink moment A that is not later than PSI reporting includes at least one of the following: the PRS in the at least one cycle is measured within an active time at the downlink moment A that is not later than PSI reporting, or the PRS in the at least one cycle is measured within an inactive time at the downlink moment A that is not later than PSI reporting. For example, if the UE does not measure all PRSs that are associated with the PSI within the inactive time at the downlink moment A that is not later than PSI reporting, the PSI is dropped and is not reported. Alternatively, he positioning reporting behavior is performed if positioning measurement is performed before a first downlink moment prior to a PSI reporting time and after a second downlink moment prior to the PSI reporting time, where an interval between the first downlink moment and the PSI reporting time is first preset duration, an interval between the second downlink moment and the PSI reporting time is second preset duration, and the positioning measurement includes positioning measurement within an active time or an inactive time in a DRX cycle indicated by the DRX configuration information. PSI includes a positioning measurement result and/or a location estimation result, and the positioning measurement result and/or the location estimation result are/is associated with measurement of a PRS. When a PRS in at least one cycle is measured before a downlink moment A that is not later than PSI reporting and at a downlink moment B that is not prior to PSI reporting, the PSI is reported (or the PSI is not dropped); otherwise, the PSI is dropped. That a PRS in at least one cycle is measured before a downlink moment A that is not later than PSI reporting and at a downlink moment B that is not prior to PSI reporting includes at least one of the following: the PRS in the at least one cycle is measured within an active time at the downlink moment A that is not later than PSI reporting or the downlink moment B that is not prior to PSI reporting. Alternatively, the PRS in the at least one cycle is measured within an inactive time at the downlink moment A that is not later than PSI reporting and the downlink moment B that is not prior to PSI reporting. For example, if the UE does not measure all PRSs that are associated with the PSI within the inactive time at the downlink moment A that is not later than PSI reporting and the downlink moment B that is not prior to PSI reporting, the PSI is dropped and is not reported.

Optionally, a PRS in one cycle may be further understood as one PRS occasion.

Optionally, the first downlink moment, the first preset duration, the second downlink moment, or the second preset duration may be indicated by the network, stipulated in the protocol, or selected by UE.

In addition, the positioning method in this embodiment of this application further includes: sending PSI to the serving base station or the location server according to the DRX configuration information and the PSI configuration information.

The PSI includes at least one of the following:

information used to indicate whether only the PSI is supported to be reported within a DRX active time indicated by the DRX configuration information, to assist the network device in further adjusting a subsequent positioning procedure or configuration, where for example, the network device further indicates to the service gNB or the UE that a restriction on measuring PSI only within the active time needs to be lifted;

information used to indicate whether only a PRS corresponding to the PSI is supported to be measured within the DRX active time, to assist the network device in further adjusting a subsequent positioning procedure or configuration, where for example, the network device further indicates to the service gNB or the UE that a restriction on measuring a PRS only within the active time needs to be lifted.

In addition, this embodiment of this application further includes: receiving a restriction indication, where the restriction indication includes a PRS measurement restriction indication or a PSI reporting restriction indication; and performing the positioning measurement behavior only during running of a DRX on-duration timer according to the PRS measurement restriction indication, or performing the positioning reporting behavior only during running of a DRX on-duration timer according to the PSI reporting restriction indication. The network indicates PSI reporting restriction or PRS measurement restriction by using a parameter. When this parameter is indicated, the UE can only report PSI or measure a PRS within the time of the drx-onDurationtimer.

Alternatively, the protocol directly stipulates that the UE does not expect to report PSI or measure a PRS outside the time of the drx-onDurationtimer.

According to the positioning method in this embodiment of this application, positioning measurement or positioning reporting is performed according to DRX configuration information and positioning configuration information, so that accurate positioning of a terminal can be ensured while meeting power saving performance in a DRX scenario.

It should be noted that the positioning method provided in the embodiments of this application may be performed by a positioning apparatus, or a control module that is in the positioning apparatus and that is configured to perform the positioning method. In the embodiments of this application, an example in which the positioning apparatus performs the positioning method is used to describe the positioning apparatus provided in the embodiments of this application.

Figure 3:
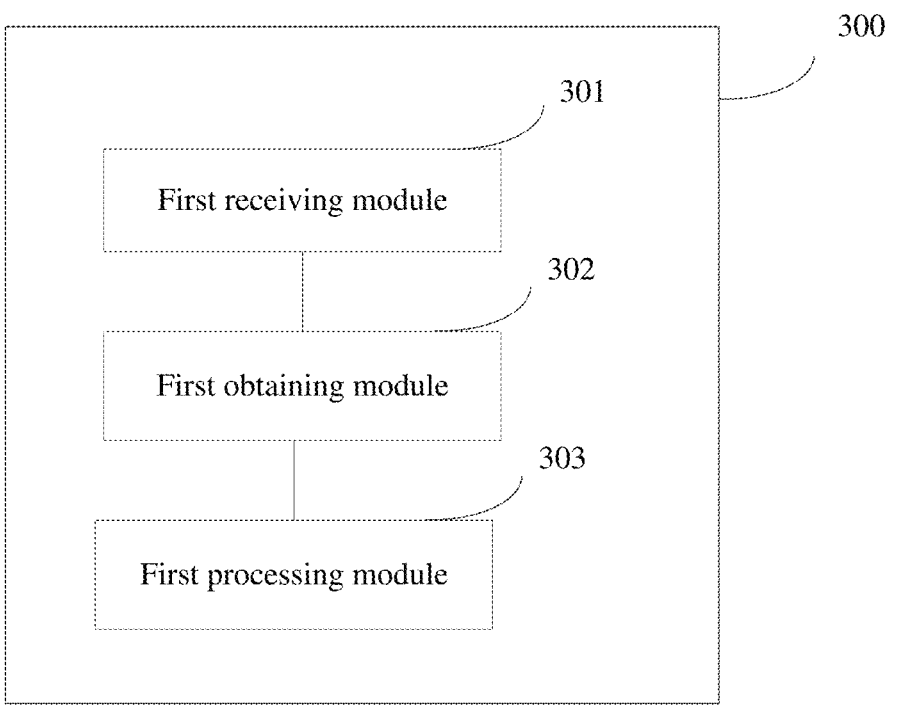
FIG. 3 is a schematic structural diagram of modules of a positioning apparatus according to an embodiment of this application.

As shown in FIG. 3, a positioning apparatus 300 in an embodiment of this application includes but is not limited to the following modules:

a first receiving module 301, configured to receive discontinuous reception DRX configuration information;

a first obtaining module 302, configured to obtain positioning configuration information, where the positioning configuration information includes at least one of positioning reference signal PRS configuration information or positioning state information PSI configuration information; or a first processing module 303, configured to perform a corresponding positioning behavior according to the DRX configuration information and the positioning configuration information, where the positioning behavior includes at least one of a positioning measurement behavior or a positioning reporting behavior.

Optionally, when the positioning behavior includes the positioning measurement behavior, the first processing module 303 includes one of the following:

a first processing submodule, configured to not perform the positioning measurement behavior within a DRX inactive time;

a second processing submodule, configured to perform the positioning measurement behavior according to the PRS configuration information within the DRX inactive time;

a third processing submodule, configured to determine, according to indication information, whether the positioning measurement behavior can be performed within the DRX inactive time, where the indication information includes first indication information indicating that the positioning measurement behavior can be performed within the DRX inactive time or second indication information indicating that the positioning measurement behavior cannot be performed within the DRX inactive time; and a fourth processing submodule, configured to perform the positioning measurement behavior according to the PRS configuration information within a DRX active time indicated by the DRX configuration information, where the DRX inactive time may be determined according to the DRX configuration information.

Optionally, the second processing submodule includes one of the following:

a first processing unit, configured to: measure a PRS of a first type according to the PRS configuration information within the DRX inactive time and not measure a PRS of a second type;

a second processing unit, configured to measure all PRSs according to the PRS configuration information within the DRX inactive time;

a third processing unit, configured to measure, according to the PRS configuration information within the DRX inactive time, a PRS whose positioning priority is greater than or equal to a preset threshold; and a fourth processing unit, configured to: if an indication signal indicating sleep is monitored, perform the positioning measurement behavior during running of a DRX on-duration timer outside the DRX active time based on third indication information, where the third indication information is used to indicate that the positioning measurement behavior can be performed during running of the DRX on-duration timer outside the DRX active time.

Optionally, the PRS of the first type is an on demand PRS, and the PRS of the second type is an aperiodic PRS, a semi-persistent PRS, or a periodic PRS;

or the PRS of the first type is an aperiodic PRS, and the PRS of the second type is a semi-persistent PRS or a periodic PRS;

or the PRS of the first type is an aperiodic PRS or a semi-persistent PRS, and the PRS of the second type is a periodic PRS.

Optionally, the positioning apparatus further includes: a second obtaining module, configured to obtain positioning priority information, where the positioning priority information includes a measurement priority of a target PRS, and the target PRS includes at least one of an aperiodic PRS, a semi-persistent PRS, a periodic PRS, or an on demand PRS.

Optionally, the second processing submodule further includes one of the following:

a fifth processing unit, configured to: if the terminal is configured with a measurement gap, perform the positioning measurement behavior according to the PRS configuration information within the DRX inactive time;

a sixth processing unit, configured to: if the terminal sends a measurement gap request to a serving base station and the terminal is configured with the measurement gap, perform the positioning measurement behavior according to the PRS configuration information within the DRX inactive time;

a seventh processing unit, configured to: if the terminal does not send the measurement gap request to the serving base station, perform the positioning measurement behavior according to the PRS configuration information within the DRX inactive time; and an eighth processing unit, configured to: if the measurement gap request is sent to the serving base station and first feedback information fed back by the serving base station is received, perform the positioning measurement behavior according to the PRS configuration information within the DRX inactive time, where the first feedback information is used to indicate that the terminal can perform the positioning measurement behavior within the DRX inactive time.

Optionally, the second processing submodule further includes:

a ninth processing unit, configured to perform the positioning measurement behavior according to the PRS configuration information within a measurement gap window in the DRX inactive time, where the measurement gap window is determined according to the measurement gap.

Optionally, the first processing submodule includes one of the following:

a tenth processing unit, configured to: if a measurement gap request is not sent to a serving base station, not perform the positioning measurement behavior within the DRX inactive time;

an eleventh processing unit, configured to: if the terminal is not configured with a measurement gap, not perform the positioning measurement behavior within the DRX inactive time;

a twelfth processing unit, configured to: if a measurement gap request is sent to the serving base station but the terminal is not configured with the measurement gap, not perform the positioning measurement behavior within the DRX inactive time;

a thirteenth processing unit, configured to: if a measurement gap request is sent to the serving base station and second feedback information fed back by the serving base station is received, not perform the positioning measurement behavior within the DRX inactive time, where the second feedback information is used to indicate that the terminal cannot perform the positioning measurement behavior within the DRX inactive time;

a fourteenth processing unit, configured to: if an indication signal indicating sleep is monitored, not perform the positioning measurement behavior during running of a DRX on-duration timer outside the DRX active time; and a fifteenth processing unit, configured to: if an indication signal indicating sleep is monitored, not perform the positioning measurement behavior during running of the DRX on-duration timer outside the DRX active time based on fourth indication information, where the fourth indication information is used to indicate that the positioning measurement behavior is not supported to be performed during running of the DRX on-duration timer outside the DRX active time.

Optionally, when the positioning behavior includes the positioning reporting behavior, the first processing module 303 further includes one of the following:

a fifth processing submodule, configured to not perform the positioning reporting behavior within the DRX inactive time;

a sixth processing submodule, configured to perform the positioning reporting behavior according to the PSI configuration information within the DRX inactive time;

a seventh processing submodule, configured to perform the positioning reporting behavior according to the PSI configuration information within the DRX active time indicated by the DRX configuration information; and an eighth processing submodule, configured to determine, according to indication information, whether the positioning reporting behavior can be performed within the DRX inactive time, where the indication information includes fifth indication information indicating that the positioning reporting behavior can be performed within the DRX inactive time or sixth indication information indicating that the positioning reporting behavior cannot be performed within the DRX inactive time.

Optionally, the sixth processing submodule includes one of the following:

a first processing subunit, configured to: report PSI of a third type according to the PSI configuration information within the DRX inactive time and not report PSI of a fourth type;

a second processing subunit, configured to report all PSI according to the PSI configuration information within the DRX inactive time;

a third processing subunit, configured to report, according to the PSI configuration information within the DRX inactive time, PSI whose reporting priority is greater than or equal to a preset threshold; and a fourth processing subunit, configured to: if an indication signal indicating sleep is monitored, perform the positioning reporting behavior during running of the DRX on-duration timer outside the DRX active time based on seventh indication information, where the seventh indication information is used to indicate that the positioning reporting behavior is supported to be performed during running of the DRX on-duration timer outside the DRX active time.

Optionally, the PSI of the third type is on demand PSI, and the PSI of the fourth type is aperiodic PSI, semi-persistent PSI, or periodic PSI;

or the PSI of the third type is aperiodic PSI, and the PSI of the fourth type is periodic PSI or semi-persistent PSI;

or the PSI of the third type is aperiodic PSI or semi-persistent PSI, and the PSI of the fourth type is periodic PSI;

or the PSI of the third type is aperiodic PSI on a physical uplink shared channel PUSCH, and the PSI of the fourth type is semi-persistent PSI on a PUSCH, semi-persistent PSI on a physical uplink control channel PUCCH, periodic PSI on a PUCCH, or periodic PSI on a PUSCH;

or the PSI of the third type is aperiodic PSI on a PUSCH or semi-persistent PSI on a PUSCH, and the PSI of the fourth type is semi-persistent PSI on a PUCCH, periodic PSI on a PUCCH, or periodic PSI on a PUSCH;

or the PSI of the third type is aperiodic PSI on a PUSCH, semi-persistent PSI on a PUSCH, or periodic PSI on a PUSCH, and the PSI of the fourth type is semi-persistent PSI on a PUCCH or periodic PSI on a PUCCH;

or the PSI of the third type is PSI on a PUSCH, and the PSI of the fourth type is PSI on a PUCCH;

or the PSI of the third type is PSI on a PUCCH, and the PSI of the fourth type is PSI on a PUSCH.

Optionally, the positioning apparatus further includes: a third obtaining module, configured to obtain positioning priority information, where the positioning priority information includes a measurement priority of a target PRS, and the target PRS includes at least one of an aperiodic PRS, a semi-persistent PRS, a periodic PRS, or an on demand PRS; and the third processing subunit is configured to report, according to the PSI configuration information within the DRX inactive time, PSI corresponding to positioning measurement whose positioning priority is greater than or equal to a first threshold.

Optionally, the positioning apparatus further includes: a fourth obtaining module, configured to obtain reporting priority information, where the reporting priority information includes a reporting priority of target PSI, and the target PSI includes at least one of an aperiodic PSI, semi-persistent PSI, periodic PSI, on-demand PSI, PSI on a PUSCH, PSI on a PUCCH, aperiodic PSI on a PUSCH, semi-persistent PSI on a PUSCH, semi-persistent PSI on a PUCCH, periodic PSI on a PUCCH, or periodic PSI on a PUSCH; and the third processing subunit is configured to report, according to the PSI configuration information within the DRX inactive time, PSI whose reporting priority is greater than or equal to a second threshold.

Optionally, when the positioning behavior includes the positioning reporting behavior, in a case that the terminal can perform the positioning reporting behavior at an active time or an inactive time, the first processing module further includes:

a ninth processing submodule, configured to: perform the positioning reporting behavior if positioning measurement associated with the positioning reporting behavior meets a target time requirement; otherwise, not perform the positioning reporting behavior.

Optionally, the ninth processing submodule includes:

a fourth processing subunit, configured to perform the positioning reporting behavior if the positioning measurement is performed before a first downlink moment prior to a PSI reporting time, where a gap between the first downlink moment and the PSI reporting time is first preset duration, and the positioning measurement includes positioning measurement within an active time or an inactive time in a DRX cycle indicated by the DRX configuration information.

Optionally, the ninth processing submodule includes:

a fifth processing subunit, configured to perform the positioning reporting behavior if the positioning measurement is performed before a first downlink moment prior to a PSI reporting time and after a second downlink moment prior to the PSI reporting time, where a gap between the first downlink moment and the PSI reporting time is first preset duration, a gap between the second downlink moment and the PSI reporting time is second preset duration, and the positioning measurement includes positioning measurement within an active time or an inactive time in a DRX cycle indicated by the DRX configuration information.

Optionally, the fifth processing submodule includes one of the following:

a sixth processing subunit, configured to: if an indication signal indicating sleep is monitored, not perform the positioning reporting behavior during running of the DRX on-duration timer outside the DRX active time; and a seventh processing subunit, configured to: if an indication signal indicating sleep is monitored, not perform the positioning reporting behavior during running of the DRX on-duration timer outside the DRX active time based on eighth indication information, where the eighth indication information is used to indicate that the positioning reporting behavior is not supported to be performed during running of the DRX on-duration timer outside the DRX active time.

Optionally, in a case that the positioning behavior includes the positioning reporting behavior, the positioning apparatus further includes:

a first sending module, configured to send PSI to a serving base station or a location server according to the DRX configuration information and the PSI configuration information, where the PSI includes at least one of the following:

information used to indicate whether only the PSI is supported to be reported within a DRX active time indicated by the DRX configuration information; or information used to indicate whether only a PRS corresponding to the PSI is supported to be measured within the DRX active time.

Optionally, the positioning apparatus further includes:

a second receiving module, configured to receive a restriction indication, where the restriction indication includes a PRS measurement restriction indication or a PSI reporting restriction indication; and a second processing module, configured to: perform the positioning measurement behavior only during running of a DRX on-duration timer according to the PRS measurement restriction indication, or perform the positioning reporting behavior only during running of a DRX on-duration timer according to the PSI reporting restriction indication.

According to the positioning apparatus in this embodiment of this application, positioning measurement or positioning reporting is performed according to DRX configuration information and positioning configuration information, so that accurate positioning of a terminal in a DRX scenario can be implemented.

The positioning apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not limited in this embodiment of this application.

The positioning apparatus in this embodiment of this application may be an apparatus with an operating system. The operating system may be an Android operating system, an iOS operating system, or another possible operating system. This is not limited in this embodiment of this application.

The positioning apparatus provided in this embodiment of this application can implement the processes implemented in the method embodiment in FIG. 2, and achieve a same technical effect. To avoid repetition, details are not described herein again.

Figures 4, 5:
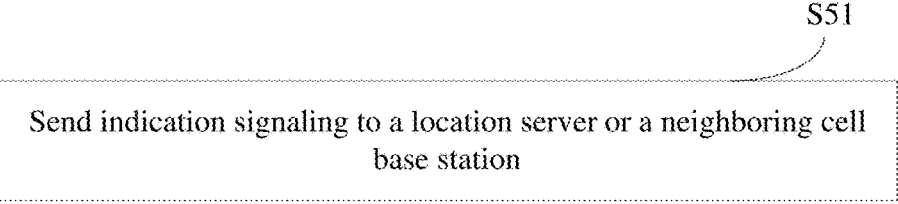
FIG. 4 is a structural block diagram of a terminal according to an embodiment of this application.
FIG. 5 is a schematic flowchart of an information transmission method according to an embodiment of this application.

FIG. 4 is a schematic structural diagram of hardware of a terminal according to an embodiment of this application.

A terminal 400 includes but is not limited to at least a part of components such as a radio frequency unit 401, a network module 402, an audio output unit 403, an input unit 404, a sensor 405, a display unit 406, a user input unit 407, an interface unit 408, a memory 409, and a processor 410.

A person skilled in the art can understand that the terminal 400 may further include a power supply (such as a battery) that supplies power to each component. The power supply may be logically connected to the processor 410 by using a power supply management system, to implement functions such as charging and discharging management, and power consumption management by using the power supply management system. The terminal structure shown in FIG. 4 constitutes no limitation on the terminal, and the terminal may include more or fewer components than those shown in the figure, or combine some components, or have different component arrangements. Details are not described herein.

It should be understood that, in this embodiment of this application, the input unit 404 may include a graphics processing unit (GPU) 4041 and a microphone 4042, and the graphics processing unit 4041 processes image data of a still picture or a video obtained by an image capture apparatus (such as a camera) in a video capture mode or an image capture mode. The display unit 406 may include a display panel 4061. Optionally, the display panel 4061 may be configured in a form such as a liquid crystal display or an organic light-emitting diode. The user input unit 407 includes a touch panel 4071 and another input device 4072. The touch panel 4071 is also referred to as a touchscreen. The touch panel 4071 may include two parts: a touch detection apparatus and a touch controller. Another input device 4072 may include but is not limited to a physical keyboard, a functional button (such as a volume control button or a power on/off button), a trackball, a mouse, and a joystick. Details are not described herein.

In this embodiment of this application, the radio frequency unit 401 receives downlink data from a network side device and then sends the downlink data to the processor 410 for processing; and sends uplink data to the network side device, such as a serving base station. Usually, the radio frequency unit 401 includes but is not limited to an antenna, at least one amplifier, a transceiver, a coupler, a low noise amplifier, a duplexer, and the like.

The memory 409 may be configured to store a software program or an instruction and various data. The memory 409 may mainly include a program or instruction storage area and a data storage area. The program or instruction storage area may store an operating system, and an application or an instruction required by at least one function (for example, a sound playing function or an image playing function). In addition, the memory 409 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 410 may include one or more processing units. Optionally, an application processor and a modem processor may be integrated into the processor 410. The application processor mainly processes an operating system, a user interface, an application, an instruction, or the like. The modem processor mainly processes wireless communications, for example, a baseband processor. It can be understood that, alternatively, the modem processor may not be integrated into the processor 410.

The radio frequency unit 401 is configured to: receive discontinuous reception DRX configuration information; and obtain positioning configuration information, where the positioning configuration information includes at least one of positioning reference signal PRS configuration information or positioning state information PSI configuration information.

The processor 410 is configured to perform a corresponding positioning behavior according to the DRX configuration information and the positioning configuration information, where the positioning behavior includes at least one of a positioning measurement behavior or a positioning reporting behavior.

In this way, positioning measurement or positioning reporting is performed according to DRX configuration information and positioning configuration information, so that accurate positioning of a terminal in a DRX scenario can be implemented.

Optionally, when the positioning behavior includes the positioning measurement behavior, the processor 410 is configured to perform one of the following:

not performing the positioning measurement behavior within a DRX inactive time;

performing the positioning measurement behavior according to the PRS configuration information within the DRX inactive time;

determining, according to indication information, whether the positioning measurement behavior can be performed within the DRX inactive time, where the indication information includes first indication information indicating that the positioning measurement behavior can be performed within the DRX inactive time or second indication information indicating that the positioning measurement behavior cannot be performed within the DRX inactive time; and performing the positioning measurement behavior according to the PRS configuration information within a DRX active time indicated by the DRX configuration information, where the DRX inactive time may be determined according to the DRX configuration information.

Optionally, the processor 410 is configured to perform one of the following:

measuring a PRS of a first type according to the PRS configuration information within the DRX inactive time and not measuring a PRS of a second type;

measuring all PRSs according to the PRS configuration information within the DRX inactive time;

measuring, according to the PRS configuration information within the DRX inactive time, a PRS whose positioning priority is greater than or equal to a preset threshold; and if an indication signal indicating sleep is monitored, performing the positioning measurement behavior during running of a DRX on-duration timer outside the DRX active time based on third indication information, where the third indication information is used to indicate that the positioning measurement behavior can be performed during running of the DRX on-duration timer outside the DRX active time.

Optionally, the PRS of the first type is an on demand PRS, and the PRS of the second type is an aperiodic PRS, a semi-persistent PRS, or a periodic PRS;

or the PRS of the first type is an aperiodic PRS, and the PRS of the second type is a semi-persistent PRS or a periodic PRS;

or the PRS of the first type is an aperiodic PRS or a semi-persistent PRS, and the PRS of the second type is a periodic PRS.

Optionally, the positioning apparatus further includes: a second obtaining module, configured to obtain positioning priority information, where the positioning priority information includes a measurement priority of a target PRS, and the target PRS includes at least one of an aperiodic PRS, a semi-persistent PRS, a periodic PRS, or an on demand PRS.

Optionally, the processor 410 is configured to perform one of the following:

if the terminal is configured with a measurement gap, performing the positioning measurement behavior according to the PRS configuration information within the DRX inactive time;

if the terminal sends a measurement gap request to a serving base station and the terminal is configured with the measurement gap, performing the positioning measurement behavior according to the PRS configuration information within the DRX inactive time;

if the terminal does not send the measurement gap request to the serving base station, performing the positioning measurement behavior according to the PRS configuration information within the DRX inactive time; and if the measurement gap request is sent to the serving base station and first feedback information fed back by the serving base station is received, performing the positioning measurement behavior according to the PRS configuration information within the DRX inactive time, where the first feedback information is used to indicate that the terminal can perform the positioning measurement behavior within the DRX inactive time.

Optionally, the processor 410 is configured to:

perform the positioning measurement behavior according to the PRS configuration information within a measurement gap window in the DRX inactive time, where the measurement gap window is determined according to the measurement gap.

Optionally, the processor 410 is configured to perform one of the following:

if a measurement gap request is not sent to a serving base station, not perform the positioning measurement behavior within the DRX inactive time;

if the terminal is not configured with a measurement gap, not perform the positioning measurement behavior within the DRX inactive time;

if a measurement gap request is sent to the serving base station but the terminal is not configured with the measurement gap, not perform the positioning measurement behavior within the DRX inactive time;

if a measurement gap request is sent to the serving base station and second feedback information fed back by the serving base station is received, not perform the positioning measurement behavior within the DRX inactive time, where the second feedback information is used to indicate that the terminal cannot perform the positioning measurement behavior within the DRX inactive time;

if an indication signal indicating sleep is monitored, not perform the positioning measurement behavior during running of a DRX on-duration timer outside the DRX active time; and if an indication signal indicating sleep is monitored, not perform the positioning measurement behavior during running of the DRX on-duration timer outside the DRX active time based on fourth indication information, where the fourth indication information is used to indicate that the positioning measurement behavior is not supported to be performed during running of the DRX on-duration timer outside the DRX active time.

Optionally, in a case that the positioning behavior includes the positioning reporting behavior, the processor 410 is configured to perform one of the following:

not performing the positioning reporting behavior within a DRX inactive time;

performing the positioning reporting behavior according to the PSI configuration information within the DRX inactive time;

performing the positioning reporting behavior according to the PSI configuration information within the DRX active time indicated by the DRX configuration information; and determining, according to indication information, whether the positioning reporting behavior is supported to be performed within the DRX inactive time, where the indication information includes fifth indication information indicating that the positioning reporting behavior is supported to be performed within the DRX inactive time or sixth indication information indicating that the positioning reporting behavior is not supported to be performed within the DRX inactive time.

Optionally, the processor 410 is configured to perform one of the following:

reporting PSI of a third type according to the PSI configuration information within the DRX inactive time and not reporting PSI of a fourth type;

measuring all PSI according to the PSI configuration information within the DRX inactive time;

reporting, according to the PSI configuration information within the DRX inactive time, PSI whose reporting priority is greater than or equal to a preset threshold; and if an indication signal indicating sleep is monitored, performing the positioning reporting behavior during running of the DRX on-duration timer outside the DRX active time based on seventh indication information, where the seventh indication information is used to indicate that the positioning reporting behavior is supported to be performed during running of the DRX on-duration timer outside the DRX active time.

Optionally, the PSI of the third type is on demand PSI, and the PSI of the fourth type is aperiodic PSI, semi-persistent PSI, or periodic PSI;

or the PSI of the third type is aperiodic PSI, and the PSI of the fourth type is periodic PSI or semi-persistent PSI;

or the PSI of the third type is aperiodic PSI or semi-persistent PSI, and the PSI of the fourth type is periodic PSI;

or the PSI of the third type is aperiodic PSI on a physical uplink shared channel PUSCH, and the PSI of the fourth type is semi-persistent PSI on a PUSCH, semi-persistent PSI on a physical uplink control channel PUCCH, periodic PSI on a PUCCH, or periodic PSI on a PUSCH;

or the PSI of the third type is aperiodic PSI on a PUSCH or semi-persistent PSI on a PUSCH, and the PSI of the fourth type is semi-persistent PSI on a PUCCH, periodic PSI on a PUCCH, or periodic PSI on a PUSCH;

or the PSI of the third type is aperiodic PSI on a PUSCH, semi-persistent PSI on a PUSCH, or periodic PSI on a PUSCH, and the PSI of the fourth type is semi-persistent PSI on a PUCCH or periodic PSI on a PUCCH;

or the PSI of the third type is PSI on a PUSCH, and the PSI of the fourth type is PSI on a PUCCH;

or the PSI of the third type is PSI on a PUCCH, and the PSI of the fourth type is PSI on a PUSCH.

Optionally, the processor 410 is configured to obtain positioning priority information, where the positioning priority information includes a measurement priority of a target PRS, and the target PRS includes at least one of an aperiodic PRS, a semi-persistent PRS, a periodic PRS, or an on demand PRS; and the processor 410 is configured to report, according to the PSI configuration information within the DRX inactive time, PSI corresponding to positioning measurement whose positioning priority is greater than or equal to a first threshold.

Optionally, the processor 410 is configured to obtain reporting priority information, where the reporting priority information includes a reporting priority of target PSI, and the target PSI includes at least one of an aperiodic PSI, semi-persistent PSI, periodic PSI, on-demand PSI, PSI on a PUSCH, PSI on a PUCCH, aperiodic PSI on a PUSCH, semi-persistent PSI on a PUSCH, semi-persistent PSI on a PUCCH, periodic PSI on a PUCCH, or periodic PSI on a PUSCH; and the processor 410 is configured to report, according to the PSI configuration information within the DRX inactive time, PSI whose reporting priority is greater than or equal to a second threshold.

Optionally, when the positioning behavior includes the positioning reporting behavior, in a case that the terminal can perform the positioning reporting behavior at an active time or an inactive time, the processor 410 is configured to:

perform the positioning reporting behavior if positioning measurement associated with the positioning reporting behavior meets a target time requirement; otherwise, not perform the positioning reporting behavior.

The processor 410 is configured to perform the positioning reporting behavior if the positioning measurement is performed before a first downlink moment prior to a PSI reporting time, where a gap between the first downlink moment and the PSI reporting time is first preset duration, and the positioning measurement includes positioning measurement within an active time or an inactive time in a DRX cycle indicated by the DRX configuration information.

Optionally, the processor 410 is configured to perform the positioning reporting behavior if the positioning measurement is performed before a first downlink moment prior to a PSI reporting time and after a second downlink moment prior to the PSI reporting time, where a gap between the first downlink moment and the PSI reporting time is first preset duration, a gap between the second downlink moment and the PSI reporting time is second preset duration, and the positioning measurement includes positioning measurement within an active time or an inactive time in a DRX cycle indicated by the DRX configuration information.

Optionally, the processor 410 is configured to perform one of the following:

if an indication signal indicating sleep is monitored, not performing the positioning reporting behavior during running of the DRX on-duration timer outside the DRX active time; and if an indication signal indicating sleep is monitored, not performing the positioning reporting behavior during running of the DRX on-duration timer outside the DRX active time based on eighth indication information, where the eighth indication information is used to indicate that the positioning reporting behavior is not supported to be performed during running of the DRX on-duration timer outside the DRX active time.

Optionally, in a case that the positioning behavior includes the positioning reporting behavior, the radio frequency unit is configured to:

send PSI to a serving base station or a location server according to the DRX configuration information and the PSI configuration information, where the PSI includes at least one of the following:

information used to indicate whether only the PSI is supported to be reported within a DRX active time indicated by the DRX configuration information; or information used to indicate whether only a PRS corresponding to the PSI is supported to be measured within the DRX active time.

Optionally, the radio frequency unit is configured to receive a restriction indication, where the restriction indication includes a PRS measurement restriction indication or a PSI reporting restriction indication; and the processor is configured to: perform the positioning measurement behavior only during running of a DRX on-duration timer according to the PRS measurement restriction indication, or perform the positioning reporting behavior only during running of a DRX on-duration timer according to the PSI reporting restriction indication.

In this way, positioning measurement or positioning reporting is performed according to DRX configuration information and positioning configuration information, so that accurate positioning of a terminal can be ensured while meeting power saving performance in a DRX scenario.

In addition, an embodiment of this application further provides an information transmission method, performed by a serving base station. As shown in FIG. 5, the method includes the following steps.

Step 51: Send indication signaling to a location server or a neighboring cell base station, where the indication signaling includes at least one of the following:

Information used to indicate a discontinuous reception DRX configuration parameter. The information may be alternatively sent by a terminal to the location server or the neighboring cell base station. For a solution in which the information is sent by the terminal, before the terminal sends a DRX configuration, UE further receives a DRX configuration request sent by the location server, to request the UE to report the associated DRX configuration. For a solution the information is sent by the serving base station, before sending the DRX configuration parameter, a serving gNB receives request information sent by the location server, where the indication signaling is sent based on the request information.

Optionally, the DRX configuration parameter includes DRX-related timer information, DRX cycle information (a long DRX cycle and a short DRX cycle), and DRX time domain offset information (a long DRX offset and a DRX slot offset). The DRX-related timer information includes at least one of a drx-onDurationtimer length, a drx-Inactivity-timer length, drx-HARQ-RTT-TimerDL, drx-HARQ-RTT-TimerUL, drx-RetransmissionTimerDL, or drx-Retransmis-sionTimerUL. Optionally, the DRX configuration may be included in a PRS configuration in the gNB to be sent to the location server.

Information used to indicate whether a DRX on-duration timer is started in a next DRX cycle. The serving gNB indicates, by using a DCI format 2-6, whether the UE starts the drx-onDurationTimer in the next DRX cycle. Before or after sending the signaling, the serving gNB also indicates, to the location server or a neighboring cell (or a neighboring gNB) by using the signaling, "whether to start the drx-onDurationTimer in the next DRX cycle". Optionally, a secondary location server is used to adjust the PRS configuration or the neighboring cell skips invalid PRS sending. For example, DCI 2-6 indicates that the UE does not start the drx-onDurationTimer in the next DRX cycle, and the serving gNB also indicates, to the location server or the neighboring cell (or the neighboring gNB) by using the signaling, that the drx-onDurationTimer is not started in the next DRX cycle. Alternatively, the serving gNB also indicates, to the location server or the neighboring cell (or the neighboring gNB) by using the signaling, that a PRS does not need to be sent when the UE is in a sleep state (sleep indicated by the DCI format 2-6) or within a specific period or in a particular time range. Optionally, after receiving the information, the location server further indicates, to the gNB involved in positioning, that is, the gNB involved in positioning adjusts the corresponding PRS for sending. Optionally, the location server or the serving gNB may indicate to the gNB involved in positioning in a muting pattern, for example, a periodic muting pattern.

Optionally, related information of the "information indicating whether a DRX on-duration timer is started in a next DRX cycle" may be further sent by the terminal to the location server or the neighboring cell (or the neighboring gNB).

Information used to indicate changing a DRX state. When the serving gNB indicates, by using MAC CE signaling, that the UE changes a DRX state, before or after sending the signaling, the serving gNB also indicates "the DRX state change" to the location server or the neighboring cell (or the neighboring gNB) by using the signaling, or indicates, to the location server or the neighboring cell (or the neighboring gNB) by using the signaling, that a PRS does not need to be sent when the UE is in a sleep state (due to the DRX state change) or within a particular period or in a particular time range. Optionally, a secondary location server is used to adjust the PRS configuration or the neighboring cell skips invalid PRS sending. Optionally, the location server may further instruct, by using the signaling, the gNB involved in positioning to adjust the corresponding PRS for sending. Optionally, the location server or the serving gNB may indicate to the gNB involved in positioning in a muting pattern, for example, a periodic muting pattern.

For example, a DRX Command MAC CE is used to instruct the UE to stop the drx-ondurationtimer, and the signaling is also used to indicate, to the location server or the neighboring cell, that "the drx-ondurationtimer is stopped", or for example, a PRS does not need to be sent in a drx-ondurationtimer time range in which stopping is indicated.

Optionally, related signaling of the foregoing DRX state change may be alternatively sent by the terminal to the location server or the neighboring cell (or the neighboring gNB).

It should be noted that, in this embodiment of this application, signaling between the location server and the UE includes but is not limited to one of the following: a combination between LPP, NRPP, and NRPPa and (signaling between the gNB and the UE), and a combination between LPPa and (signaling between the gNB and the UE).

The signaling between the gNB and the UE includes but is not limited to one of the following: RRC, MAC CE, DCI, Msg1, Msg3, broadcast signaling, and paging, and a combination of the foregoing signaling. For the neighboring gNB, the signaling may be alternatively air interface signaling, for example, a signal.

Signaling between the gNB and the location server includes but is not limited to one of the following: LPPa and NRPPa. Signaling or interface between gNBs includes but is not limited to one of the following: an Xn interface, interacting with the location server through NRPPa or LPPa, and then interacting with another gNB by the location server through NRPPa or LPPa, an ideal backhaul, a non-ideal backhaul, and air interface signaling (for example, some signals).

It should be noted that the information transmission method provided in this embodiment of this application may be performed by an information transmission apparatus, or a control module that is in the information transmission apparatus and that is configured to perform the information transmission method. In this embodiment of this application, that the information transmission apparatus performs the information transmission method is used as an example to describe the information transmission apparatus provided in this embodiment of this application.

Figure 6:
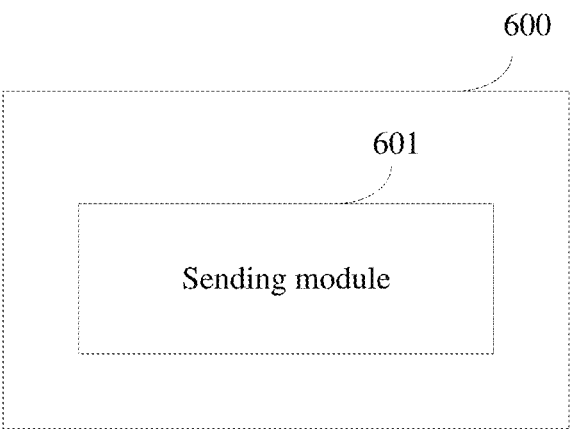
FIG. 6 is a schematic structural diagram of modules of an information transmission apparatus according to an embodiment of this application.

As shown in FIG. 6, an information transmission apparatus in an embodiment of this application includes but is not limited to the following modules:

a sending module 610, configured to send indication signaling to a location server or a neighboring cell base station, where the indication signaling includes at least one of the following:

information used to indicate a discontinuous reception DRX configuration parameter;

information used to indicate whether a DRX on-duration timer is started in a next DRX cycle; or information used to indicate changing a DRX state.

Optionally, the DRX configuration parameter includes DRX-related timer information, DRX cycle information, and DRX time domain offset information.

The information transmission apparatus further includes a receiving module, configured to receive request information sent by the location server, where the indication signaling is sent based on the request information.

In this embodiment of this application, indication signaling is sent to a location server, to assist the location server in better positioning configuration, thereby improving positioning accuracy.

Figure 7:
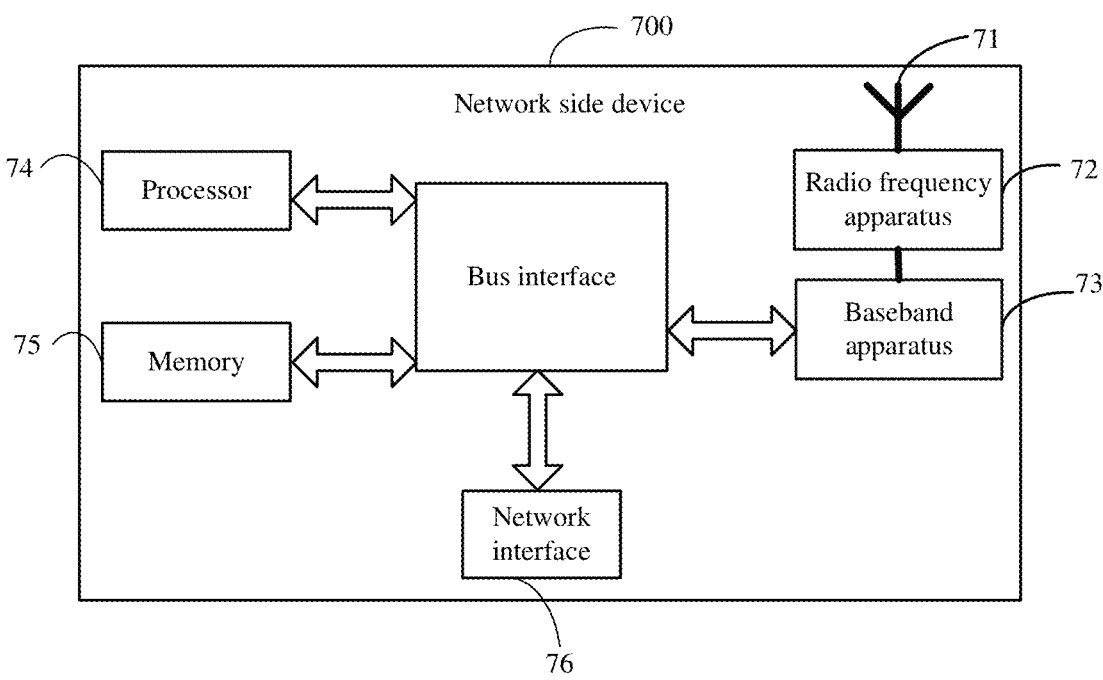
FIG. 7 is a structural block diagram of a serving base station according to an embodiment of this application.

Illustratively, an embodiment of this application further provides a network side device. As shown in FIG. 7, a network device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes information that needs to be sent, and sends processed information to the radio frequency apparatus 72. The radio frequency apparatus 72 processes the received information, and sends processed information by using the antenna 71.

The frequency band processing apparatus may be located in the baseband apparatus 73. The method performed by the network side device in the foregoing embodiment may be implemented in the baseband apparatus 73. The baseband apparatus 73 includes a processor 74 and a memory 75.

The baseband apparatus 73 may include, for example, at least one baseband board, where a plurality of chips are disposed on the baseband board. As shown in FIG. 7, one chip is, for example, the processor 74, which is connected to the memory 75, so as to invoke a program in the memory 75 to perform operations of the network device shown in the foregoing method embodiment.

The baseband apparatus 73 may further include a network interface 76, configured to exchange information with the radio frequency apparatus 72. For example, the interface is a common public radio interface (CPRI).

Illustratively, the network side device in this embodiment of the present invention further includes an instruction or a program that is stored in the memory 75 and that can be run on the processor 74. The processor 74 invokes the instruction or the program in the memory 75 to perform the method performed by the modules shown in FIG. 6, and a same technical effect is achieved. To avoid repetition, details are not described herein again.

Figure 8:
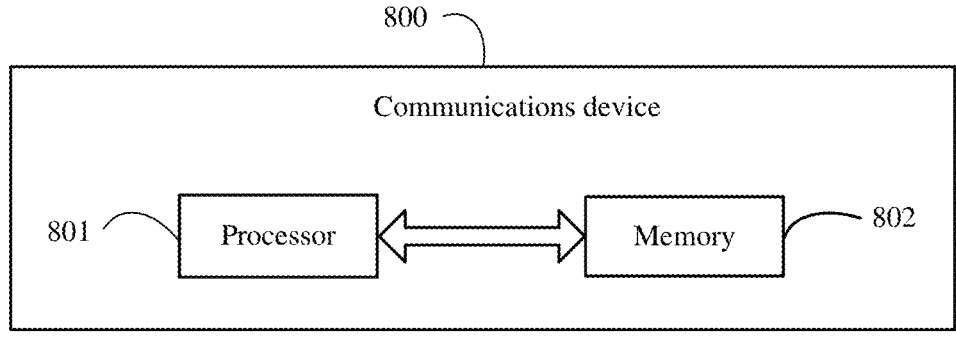
FIG. 8 is a structural block diagram of a communications device according to an embodiment of this application.

Optionally, as shown in FIG. 8, an embodiment of this application further provides a communications device 800, including a processor 801, a memory 802, and a program or an instruction that is stored in the memory 802 and that can be run on the processor 801. For example, when the communications device 800 is a terminal, the program or the instruction is executed by the processor 801 to implement the processes of the foregoing positioning method embodiment, and a same technical effect can be achieved. When the communications device 800 is a network side device, the program or the instruction is executed by the processor 801 to implement the processes of the foregoing information transmission method embodiment, and a same technical effect can be achieved. To avoid repetition, details are not described herein again.

An embodiment of this application further provides a non-transitory readable storage medium. The non-transitory readable storage medium stores a program or an instruction, and when the program or the instruction is executed by a processor, the processes of the foregoing positioning method embodiment or the foregoing information transmission method embodiment are implemented and a same technical effect can be achieved. To avoid repetition, details are not described herein again.

The processor is a processor in the terminal in the foregoing embodiment. The non-transitory readable storage medium includes a non-transitory computer-readable storage medium, such as a computer read-only memory (ROM), a random access memory (RAM), a magnetic disk, or an optical disc.

Optionally, an embodiment of this application further provides a chip. The chip includes a processor and a communications interface, the communications interface is coupled to the processor, and the processor is configured to run a program or an instruction of a network side device to implement the processes of the foregoing positioning method embodiment and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A positioning method, performed by a terminal and comprising:

receiving discontinuous reception (DRX) configuration information;

obtaining positioning configuration information, the positioning configuration information comprising at least one of positioning reference signal (PRS) configuration information or positioning state information (PSI) configuration information; and performing a corresponding positioning behavior according to the DRX configuration information and the positioning configuration information; wherein:

the positioning behavior comprises at least one of a positioning measurement behavior or a positioning reporting behavior;

in a case that the positioning behavior comprises the positioning measurement behavior, performing the corresponding positioning behavior according to the DRX configuration information and the positioning configuration information comprises one of following:

performing the positioning measurement behavior according to the PRS configuration information within a DRX inactive time; or determining, according to indication information, whether the positioning measurement behavior is supported to be performed within the DRX inactive time;

the indication information comprises first indication information indicating that the positioning measurement behavior is supported to be performed within the DRX inactive time or second indication information indicating that the positioning measurement behavior is not supported to be performed within the DRX inactive time;

the positioning measurement behavior is performed according to the PRS configuration information within a DRX active time indicated by the DRX configuration information; and the DRX inactive time is determined according to the DRX configuration information.

2. The positioning method according to claim 1, wherein in a case that the positioning behavior comprises the positioning measurement behavior, performing the corresponding positioning behavior according to the DRX configuration information and the positioning configuration information includes:

not performing the positioning measurement behavior within a DRX inactive time.

3. The positioning method according to claim 2, wherein not performing the positioning measurement behavior within the DRX inactive time comprises one of following:

if a measurement gap request is not sent to a serving base station, not performing the positioning measurement behavior within the DRX inactive time;

if the terminal is not configured with a measurement gap, not performing the positioning measurement behavior within the DRX inactive time;

if a measurement gap request is sent to the serving base station but the terminal is not configured with the measurement gap, not performing the positioning measurement behavior within the DRX inactive time;

if a measurement gap request is sent to the serving base station and second feedback information fed back by the serving base station is received, not performing the positioning measurement behavior within the DRX inactive time; wherein the second feedback information is used to indicate that the terminal cannot perform the positioning measurement behavior within the DRX inactive time;

if an indication signal indicating sleep is monitored, not performing the positioning measurement behavior during running of a DRX on-duration timer outside the DRX active time; and if an indication signal indicating sleep is monitored, not performing the positioning measurement behavior during running of the DRX on-duration timer outside the DRX active time based on fourth indication information; wherein the fourth indication information is used to indicate that the positioning measurement behavior is not supported to be performed during running of the DRX on-duration timer outside the DRX active time.

4. The positioning method according to claim 1, wherein performing the positioning measurement behavior according to the PRS configuration information within the DRX inactive time comprises one of following:

measuring a PRS of a first type according to the PRS configuration information within the DRX inactive time and not measuring a PRS of a second type;

measuring all PRSs according to the PRS configuration information within the DRX inactive time;

measuring, according to the PRS configuration information within the DRX inactive time, a PRS whose positioning priority is greater than or equal to a preset threshold; and if an indication signal indicating sleep is monitored, performing the positioning measurement behavior during running of a DRX on-duration timer outside the DRX active time based on third indication information; wherein:

the third indication information is used to indicate that the positioning measurement behavior is supported to be performed during running of the DRX on-duration timer outside the DRX active time; and/or performing the positioning measurement behavior according to the PRS configuration information within the DRX inactive time comprises one of following:

if the terminal is configured with a measurement gap, performing the positioning measurement behavior according to the PRS configuration information within the DRX inactive time;

if the terminal sends a measurement gap request to a serving base station and the terminal is configured with the measurement gap, performing the positioning measurement behavior according to the PRS configuration information within the DRX inactive time;

if the terminal does not send the measurement gap request to the serving base station, performing the positioning measurement behavior according to the PRS configuration information within the DRX inactive time; and if the measurement gap request is sent to the serving base station and first feedback information fed back by the serving base station is received, performing the positioning measurement behavior according to the PRS configuration information within the DRX inactive time; and the first feedback information is used to indicate that the terminal can perform the positioning measurement behavior within the DRX inactive time.

5. The positioning method according to claim 4, wherein performing the positioning measurement behavior according to the PRS configuration information within the DRX inactive time comprises:

performing the positioning measurement behavior according to the PRS configuration information within a measurement gap window in the DRX inactive time; wherein the measurement gap window is determined according to the measurement gap.

6. The positioning method according to claim 1, wherein in a case that the positioning behavior comprises the positioning reporting behavior, performing the corresponding positioning behavior according to the DRX configuration information and the positioning configuration information comprises one of following:

not performing the positioning reporting behavior within a DRX inactive time;

performing the positioning reporting behavior according to the PSI configuration information within the DRX inactive time;

performing the positioning reporting behavior according to the PSI configuration information within the DRX active time indicated by the DRX configuration information; and determining, according to indication information, whether the positioning reporting behavior is supported to be performed within the DRX inactive time; wherein the indication information comprises fifth indication information indicating that the positioning reporting behavior is supported to be performed within the DRX inactive time or sixth indication information indicating that the positioning reporting behavior is not supported to be performed within the DRX inactive time.

7. The positioning method according to claim 6, wherein performing the positioning reporting behavior according to the PSI configuration information within the DRX inactive time comprises one of following:

reporting PSI of a third type according to the PSI configuration information within the DRX inactive time and not reporting PSI of a fourth type;

reporting all PSI according to the PSI configuration information within the DRX inactive time;

reporting, according to the PSI configuration information within the DRX inactive time, PSI whose reporting priority is greater than or equal to a preset threshold; and if an indication signal indicating sleep is monitored, performing the positioning reporting behavior during running of a DRX on-duration timer outside the DRX active time based on seventh indication information; wherein the seventh indication information is used to indicate that the positioning reporting behavior is supported to be performed during running of the DRX on-duration timer outside the DRX active time.

8. The positioning method according to claim 7, further comprising: obtaining positioning priority information; wherein the positioning priority information comprises a measurement priority of a target PRS, and the target PRS comprises at least one of an aperiodic PRS, a semi-persistent PRS, a periodic PRS, or an on demand PRS; and reporting, according to the PSI configuration information within the DRX inactive time, the PSI whose reporting priority is greater than or equal to the preset threshold comprises:

reporting, according to the PSI configuration information within the DRX inactive time, PSI corresponding to positioning measurement whose positioning priority is greater than or equal to a first threshold; and/or the positioning method further comprising: obtaining reporting priority information; wherein the reporting priority information comprises a reporting priority of target PSI, and the target PSI comprises at least one of periodic PSI, semi-persistent PSI, periodic PSI, on-demand PSI, PSI on a PUSCH, PSI on a PUCCH, aperiodic PSI on a PUSCH, semi-persistent PSI on a PUSCH, semi-persistent PSI on a PUCCH, periodic PSI on a PUCCH, or periodic PSI on a PUSCH; and reporting, according to the PSI configuration information within the DRX inactive time, the PSI whose reporting priority is greater than or equal to the preset threshold comprises:

reporting, according to the PSI configuration information within the DRX inactive time, PSI whose reporting priority is greater than or equal to a second threshold.

9. The positioning method according to claim 6, wherein not performing the positioning reporting behavior within the DRX inactive time indicated by the DRX configuration information comprises one of following:

if an indication signal indicating sleep is monitored, not performing the positioning reporting behavior during running of a DRX on-duration timer outside the DRX active time; and if an indication signal indicating sleep is monitored, not performing the positioning reporting behavior during running of the DRX on-duration timer outside the DRX active time based on eighth indication information; wherein the eighth indication information is used to indicate that the positioning reporting behavior is not supported to be performed during running of the DRX on-duration timer outside the DRX active time.

10. The positioning method according to claim 1, wherein in a case that the positioning behavior comprises the positioning reporting behavior, in a case that the terminal is supported to perform the positioning reporting behavior at an active time or an inactive time, performing the corresponding positioning behavior according to the DRX configuration information and the positioning configuration information further comprises:

performing the positioning reporting behavior if positioning measurement associated with the positioning reporting behavior meets a target time requirement; otherwise, not performing the positioning reporting behavior.

11. The positioning method according to claim 10, wherein performing the positioning reporting behavior if the positioning measurement associated with the positioning reporting behavior meets the target time requirement comprises:

performing the positioning reporting behavior if the positioning measurement is performed before a first downlink moment prior to a PSI reporting time; wherein a gap between the first downlink moment and the PSI reporting time is first preset duration, and the positioning measurement comprises positioning measurement within an active time or an inactive time in a DRX cycle indicated by the DRX configuration information; and/or performing the positioning reporting behavior if the positioning measurement associated with the positioning reporting behavior meets the target time requirement comprises:

performing the positioning reporting behavior if the positioning measurement is performed before a first downlink moment prior to a PSI reporting time and after a second downlink moment prior to the PSI reporting time; wherein a gap between the first downlink moment and the PSI reporting time is first preset duration, a gap between the second downlink moment and the PSI reporting time is second preset duration, and the positioning measurement comprises positioning measurement within an active time or an inactive time in a DRX cycle indicated by the DRX configuration information.

12. The positioning method according to claim 1, wherein in a case that the positioning behavior comprises the positioning reporting behavior, the method further comprises:

sending PSI to a serving base station or a location server according to the DRX configuration information and the PSI configuration information.

13. The positioning method according to claim 1, further comprising:

receiving a restriction indication; wherein the restriction indication comprises a PRS measurement restriction indication or a PSI reporting restriction indication; and performing the positioning measurement behavior only during running of a DRX on-duration timer according to the PRS measurement restriction indication, or performing the positioning reporting behavior only during running of a DRX on-duration timer according to the PSI reporting restriction indication.

14. A terminal, comprising a processor, a memory, and a program or an instruction that is stored in the memory and executable on the processor, wherein the program or the instruction, when executed by the processor, causes the terminal to perform:

receiving discontinuous reception (DRX) configuration information;

obtaining positioning configuration information, the positioning configuration information comprising at least one of positioning reference signal (PRS) configuration information or positioning state information (PSI) configuration information; and performing a corresponding positioning behavior according to the DRX configuration information and the positioning configuration information; wherein:

the positioning behavior comprises at least one of a positioning measurement behavior or a positioning reporting behavior;

in a case that the positioning behavior comprises the positioning measurement behavior, the program or the instruction, when executed by the processor, causes the terminal to perform one of following:

performing the positioning measurement behavior according to the PRS configuration information within a DRX inactive time; or determining, according to indication information, whether the positioning measurement behavior is supported to be performed within the DRX inactive time;

the indication information comprises first indication information indicating that the positioning measurement behavior is supported to be performed within the DRX inactive time or second indication information indicating that the positioning measurement behavior is not supported to be performed within the DRX inactive time;

the positioning measurement behavior is performed according to the PRS configuration information within a DRX active time indicated by the DRX configuration information; and the DRX inactive time is determined according to the DRX configuration information.

15. The terminal according to claim 14, wherein, in a case that the positioning behavior comprises the positioning measurement behavior, the program or the instruction, when executed by the processor, causes the terminal further to not perform: the positioning measurement behavior within a DRX inactive time.

16. The terminal according to claim 14, wherein the program or the instruction, when executed by the processor, causes the terminal to perform one of following:

measuring a PRS of a first type according to the PRS configuration information within the DRX inactive time and not measuring a PRS of a second type;

measuring all PRSs according to the PRS configuration information within the DRX inactive time;

measuring, according to the PRS configuration information within the DRX inactive time, a PRS whose positioning priority is greater than or equal to a preset threshold; and if an indication signal indicating sleep is monitored, performing the positioning measurement behavior during running of a DRX on-duration timer outside the DRX active time based on third indication information; wherein:

the third indication information is used to indicate that the positioning measurement behavior is supported to be performed during running of the DRX on-duration timer outside the DRX active time; and/or if the terminal is configured with a measurement gap, performing the positioning measurement behavior according to the PRS configuration information within the DRX inactive time;

if the terminal sends a measurement gap request to a serving base station and the terminal is configured with the measurement gap, performing the positioning measurement behavior according to the PRS configuration information within the DRX inactive time;

if the terminal does not send the measurement gap request to the serving base station, performing the positioning measurement behavior according to the PRS configuration information within the DRX inactive time; and if the measurement gap request is sent to the serving base station and first feedback information fed back by the serving base station is received, performing the positioning measurement behavior according to the PRS configuration information within the DRX inactive time; and the first feedback information is used to indicate that the terminal can perform the positioning measurement behavior within the DRX inactive time.

17. The terminal according to claim 16, wherein the program or the instruction, when executed by the processor, causes the terminal to perform one of following:

performing the positioning measurement behavior according to the PRS configuration information within a measurement gap window in the DRX inactive time; wherein the measurement gap window is determined according to the measurement gap.

* * * * *